(12) United States Patent
Caprioli et al.

(10) Patent No.: US 10,089,244 B1
(45) Date of Patent: Oct. 2, 2018

(54) HARDWARE FOR MISS HANDLING FROM A TRANSLATION PROTECTION DATA STRUCTURE

(71) Applicant: INTEL CORPORATION, Santa Clara, CA (US)

(72) Inventors: Paul Caprioli, Hillsboro, OR (US); Jeffrey J. Cook, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,646

(22) Filed: Mar. 31, 2017

(51) Int. Cl.
| | |
|---|---|
| *G06F 12/00* | (2006.01) |
| *G06F 12/128* | (2016.01) |
| *G06F 12/1045* | (2016.01) |
| *G06F 12/122* | (2016.01) |
| *G06F 12/0831* | (2016.01) |
| *G06F 12/1009* | (2016.01) |

(52) U.S. Cl.
CPC ........ *G06F 12/128* (2013.01); *G06F 12/0831* (2013.01); *G06F 12/1009* (2013.01); *G06F 12/1054* (2013.01); *G06F 12/122* (2013.01); *G06F 2212/621* (2013.01); *G06F 2212/656* (2013.01); *G06F 2212/682* (2013.01); *G06F 2212/684* (2013.01); *G06F 2212/69* (2013.01)

(58) Field of Classification Search
CPC ............... G06F 12/128; G06F 12/0831; G06F 12/1009; G06F 12/1054; G06F 12/122; G06F 2212/621; G06F 2212/656; G06F 2212/682; G06F 2212/684; G06F 2212/69
See application file for complete search history.

(56) References Cited

U.S. PATENT DOCUMENTS

2016/0283234 A1    9/2016   Xekalakis et al.

OTHER PUBLICATIONS

Online Disassembler, "Self-Modifying Code and the Cache on Intel x86," http://blog.onlinedisassembler.com/blog/?p=133, 6 pages, dated Jan. 17, 2015.

*Primary Examiner* — Shawn X Gu
(74) *Attorney, Agent, or Firm* — Lowenstein Sandler LLP

(57) ABSTRACT

A processor includes a memory to store original code and a fingerprint data structure, which stores, in a way thereof, an entry including a physical address for a page and a stored fingerprint generated from the page of the original code. A core includes a translation protection data structure (TPDS) to detect modification to the page, wherein the core is to, upon execution of a translation check instruction included within a translated page code corresponding to the page, transmit, to the TPDS, a modification check request having the physical address of the page in the memory and the way of the fingerprint data structure. A hardware TPDS miss handler is coupled to the core and is to process a miss request received from the TPDS responsive to the physical address not being present in the TPDS.

24 Claims, 16 Drawing Sheets

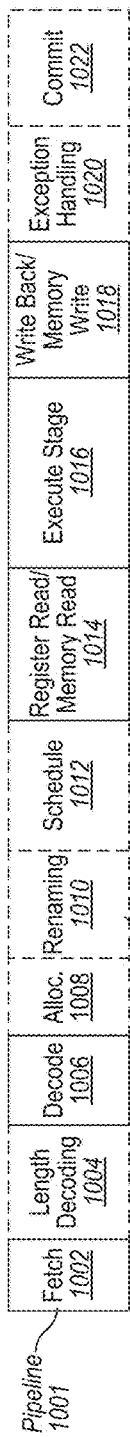
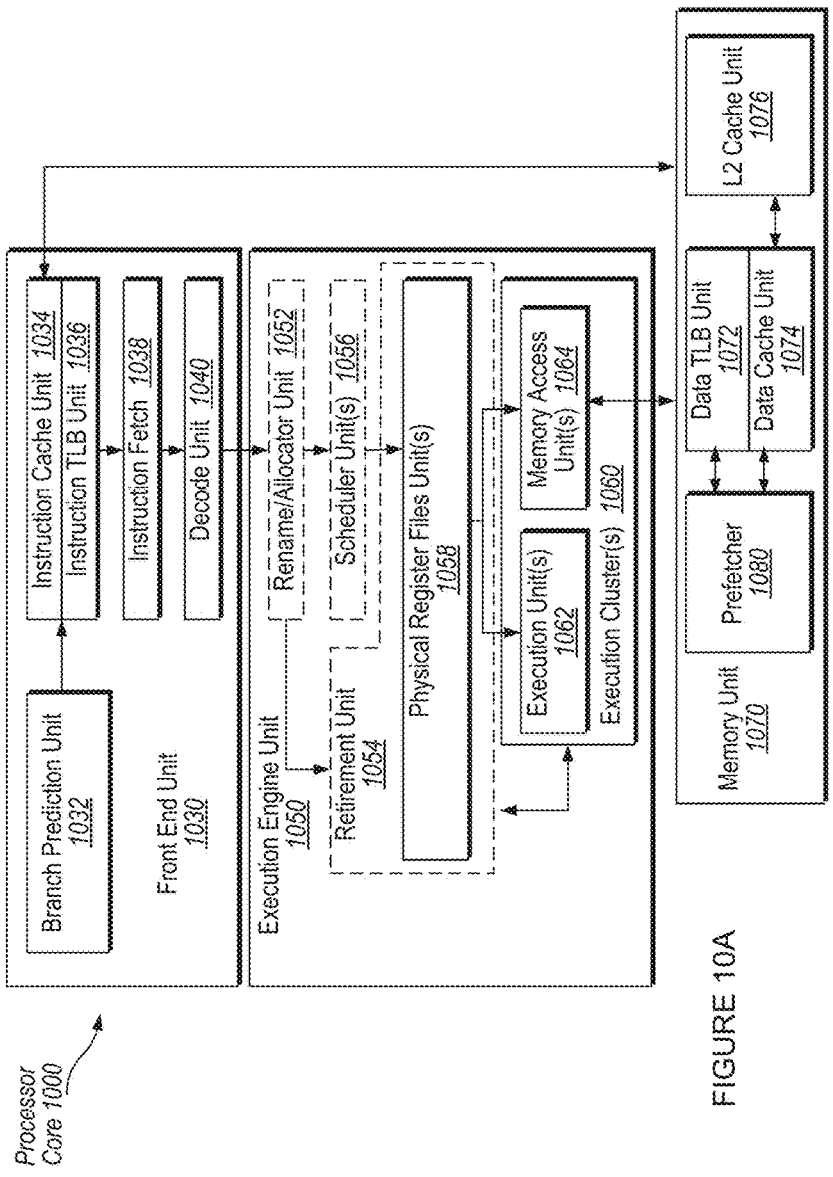
FIGURE 10B
FIGURE 10A

HARDWARE FOR MISS HANDLING FROM A TRANSLATION PROTECTION DATA STRUCTURE

TECHNICAL FIELD

The present disclosure relates to protection, in a binary translation processor, from modification of original code that has been translated, and in particular, to employment of hardware for miss handling from a translation protection data structure.

BACKGROUND

In a binary translation (BT) processor, original code is translated by system software and placed in translation storage (e.g., in main memory). The processor may then execute optimized translated code instead of the original code. The possibility of self-modifying code (SMC) or cross-modifying code (XMC), in a multicore processor, may require the BT processor to observe and honor any change to the original code, e.g., the processor may invalidate translations corresponding to modification of the original code. The processor may use a translation protection data structure (TPDS) or similar hardware, such as a translation protection table (TPT), to detect modifications to the original code. While the TPDS may reliably detect SMC/XMC events, the TPDS may not keep track of every page of code that has been translated. As the TPDS is hardware that is to respond to incoming snoops (e.g., coherency messages), the TPDS has a fixed capacity which, when exceeded, results in page entries being evicted. If the TPDS also has limited associativity, collisions are another source of evictions. In existing designs, a TPDS miss results in a trap to BT system software. The overhead is substantial for such interruption and the subsequent running of the software to fill the missing entry in the TPDS.

BRIEF DESCRIPTION OF THE DRAWINGS

FIG. 10A is a block diagram illustrating an in-order pipeline and a register renaming stage, out-of-order issue/execution pipeline according to one embodiment.

FIG. 10B is a block diagram illustrating a micro-architecture for a processor or an integrated circuit that may employ the hardware TPDS miss handler and fingerprint data structure, according to an embodiment of the present disclosure.

DESCRIPTION OF EMBODIMENTS

Accordingly, to reduce the overhead of the BT system software discussed above, the present disclosure employs a hardware translation protection data structure (TPDS) miss handler, which may be hardware coupled to a core of a multi-core processor, to fill the TPDS using a software-managed, in-memory fingerprint data structure. More specifically, when the BT system software creates translated code from original code, the translated page code for a page may be stored in system memory. The BT system software may also create a fingerprint of the page of the original code (by applying an algorithm, modulo arithmetic, or the like to the page), and store the fingerprint in the fingerprint data structure. While executing the translated code, the hardware TPDS miss handler may compute a fingerprint of a page of original code and verify that the computed fingerprint matches the stored fingerprint that the BT software previously stored in the fingerprint data structure. Upon verification that the fingerprints match, the hardware TPDS miss handler may store a new entry, including the physical address of the page, into the TPDS.

Accordingly, the disclosed hardware may handle a miss of the TPDS and fill a missing entry in the TPDS with lower latency and higher throughput than a software-based miss handling. Furthermore, by offloading the fill operation to the hardware TPDS miss handler, the core may perform other useful work, e.g., simultaneous multithreading, out-of-order instruction issues, and the like, while the miss is being processed.

Additionally, software processing of a code page to look for SMC/XMC modifications may result in the original code page polluting the data cache of the processor, as the translated page code is actually code and not later useful in the data cache. The disclosed hardware TPDS miss handler may, however, be designed to access memory in a way that bypasses a higher level cache (and probably lower level caches as well) to keep the operation of the hardware TPDS miss handler out of the cache, which better serves high-throughput processor operations. Accordingly, avoiding the cache will not have an appreciable negative impact on performance as check modification requests and subsequent processing occur occasionally, as needed, not on an ongoing basis, as will become apparent.

Furthermore, the disclosed hardware solution may enable the configuration of the TPDS (size, associativity) and management of the replacement policy of the TPDS to be hidden from software. The BT system software may be adapted to just manage the fingerprint data structure(s) in the memory. Thus, the BT system software may not need to be customized when hardware design tradeoffs lead to different TPDS designs between high-end or low-end parts or modifications in subsequent processor generations.

Figure 1:
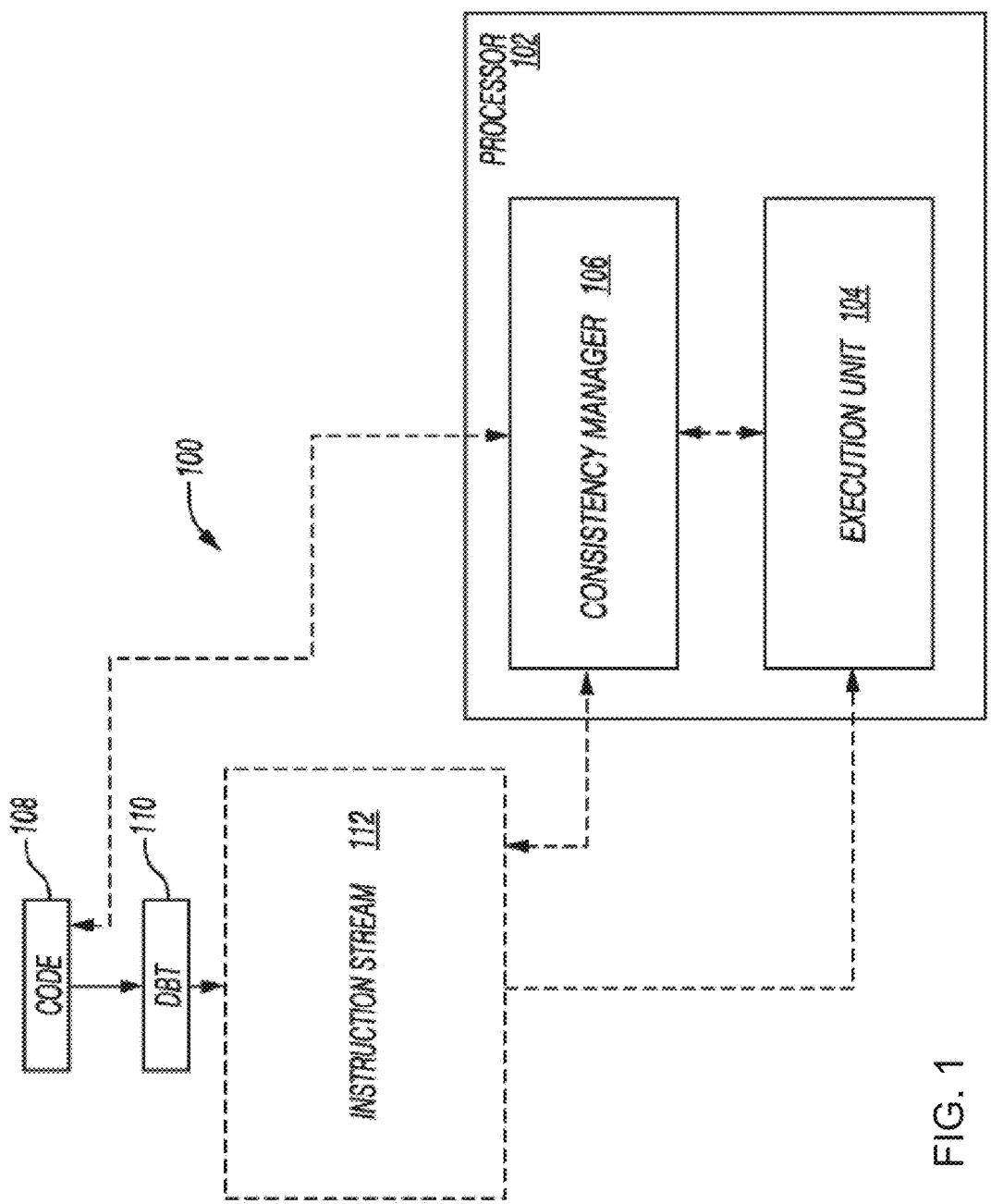
FIG. 1 is a block diagram of a system to block execution of a modified instruction, according to embodiments of the present disclosure.

FIG. 1 is a block diagram of a system 100 to block execution of a modified instruction, according to embodiments of the present disclosure. Depicted processor 102 may include an execution unit 104 and a consistency manager 106. The processor 102 may include one or more cores, e.g., which may have their own or a shared execution unit and/or consistency manager. An execution unit 104 may execute an instruction. The dotted lines are to indicate the optionality of the data communication paths that may exist between components. Other data communication paths (e.g., to components not depicted) may be included.

A code (e.g., binary code) 108 may be translated (e.g., by a dynamic binary translator (DBT) 110) from a first (e.g., untranslated) format to a second (e.g., translated) format. The DBT 110 may be in hardware, software, firmware, or a combination thereof. The code 108 (e.g., instruction(s)) may include a virtual to physical address (e.g., page) mapping. The DBT 110 may translate the code from the first format to the second format for the instruction stream 112 based on the virtual to physical address (e.g., page) translation time mapping. The virtual to physical address (e.g., page) translation time mapping and/or the data at a physical address (e.g., for the code 108) may be modified.

In various embodiments, the consistency manager 106 may detect a modification. The consistency manager may be in hardware, software, firmware, or a combination thereof. The consistency manager may cause a corrective action to be taken, e.g., causing the modified instruction or other code to not be executed. The consistency manager 106 may detect a modification in untranslated code 108. The DBT 110 may be the entity attempting to modify the instruction. In one embodiment, the consistency manager 106 includes memory or access to memory to store a translation time virtual address to physical mapping (e.g., an address translation of a page at the time of the binary translation) for a binary translated instruction (e.g., a translated code page). In one embodiment, a binary translated instruction includes a field that indicates the translation time virtual address to physical address mapping of a page of the original code.

Additionally or alternatively, the consistency manager 106 may detect a modification to the data at a physical address of the page. For example, the consistency manager may detect a modification (e.g., a store) to an instruction directed at the physical address and/or to data stored at (e.g., written to) the physical address. In one embodiment, a binary translated instruction has a virtual-to-physical address mapping (e.g., determined at binary translation time) and the consistency manager may detect, e.g., between binary translation time and run time, a modification to data at that physical address for the page. For example, the consistency manager 106 may include a connection to monitor physical addresses (e.g., in cache or system memory). For example, the consistency manager 106 may determine via a snoop hit that the physical address has been modified. Snoop traffic refers to coherency messages sent by hardware in a multi-core system to gain ownership of a location in the memory at which to store data. The snoop hit may be a modified ("dirty") as opposed to non-modified (e.g., "clean") hit. In one embodiment, "execution time" virtual to physical address mapping of the page may be determined by rechecking the code 108 to detect if the mapping has since changed (e.g., and if so, does the change block the code from executing correctly). In one embodiment, a store to a physical address of a page may not modify any physical address of a binary translated instruction(s) on that page, e.g., such that may not cause a corrective action to be initiated.

In some embodiments, the consistency manager 106 may initiate a corrective action on detection of a modification. In one embodiment, the consistency manager may detect a modification corresponding to a binary translated instruction and then block execution of the binary translated instruction. The consistency manager may control the execution of instructions (e.g., by controlling the execution unit 104) to block execution of the binary translated instruction. In one embodiment, a binary translated instruction of the instruction stream 112 may flow into the consistency manager 106 for it to test the binary translated instruction for a modification and block the modified binary translated instruction from being input into execution unit 104. In one embodiment, the consistency manager 106 may detect a modification corresponding to a binary translated instruction, block execution of the binary translated instruction, and provide the modified, untranslated (e.g., not binary translated) instruction to the execution unit 104. In one embodiment, the consistency manager 106 may detect a modification corresponding to the binary translated instruction, block execution of the binary translated instruction, and cause the DBT 110 to re-translate the modified, untranslated instruction to a modified, binary translated instruction (e.g., in instruction stream 112). For example, the modified, binary translated instruction in the instruction stream 112 may flow into the execution unit 104 for execution or into the consistency manager 106, e.g., for no additional modification check before being passed into the execution unit 104 or into an additional modification check. A scheduler (not shown) may assign an instruction to execution unit 104 and the consistency manager 106 may include or control the scheduler.

Figure 2:
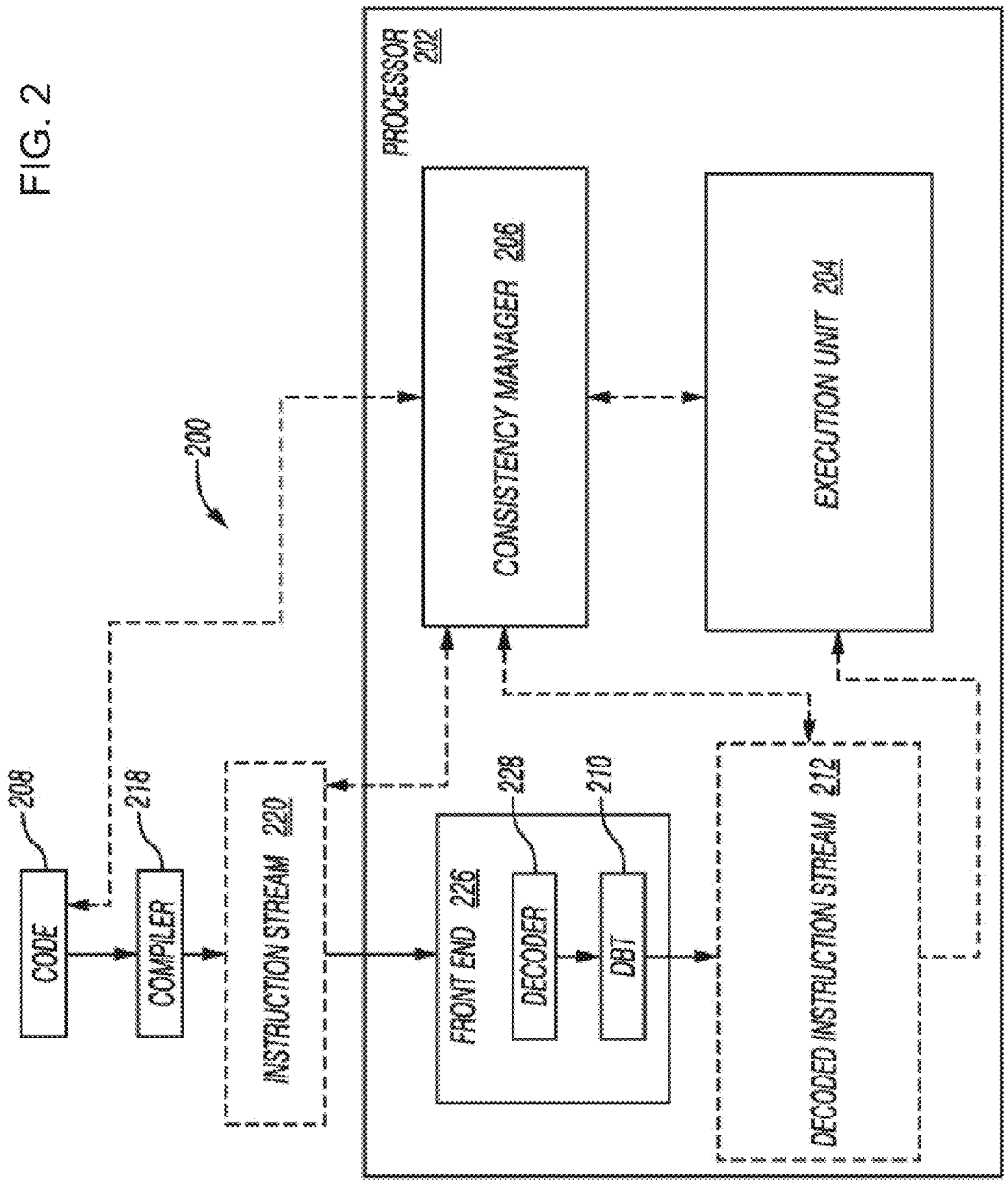
FIG. 2 is block diagram of a system to block execution of a modified instruction, according to additional embodiments of the present disclosure.

FIG. 2 is block diagram of a system 200 to block execution of a modified instruction of FIG. 1, according to additional embodiments of the present disclosure. The system 100 may include a processor 202, which may include a consistency manager 206 and an execution unit 204. The processor 202 may include one or more cores, e.g., which may have their own (or a shared) front end, DBT, execution unit, and/or consistency manager. An execution unit 204 may execute an instruction. The dashed lines are to indicate the optionality of the data communication paths that may exist between components. Other data communication paths (e.g., to components not depicted) may be included.

Code (e.g., binary code) 208 may be compiled (e.g., by a compiler 218), for example, the code 208 may be source code (e.g., written in a programming or source language) and the compiler may transform the source code into another computer language (e.g., the target machine language). The compiler may output a compiled instruction (e.g., as instruction stream 220). The compiler 218 or other component may output a logical thread assignment (e.g., logical thread designation), for example, as a field in a compiled instruction or thread. A logical thread designation may indicate to which particular logical thread a translated instruction(s) is assigned. Assigning may refer to being a member of a thread of execution.

Each instruction (or page of instructions) in an instruction stream (e.g., instruction stream 220 or decoded instruction stream 212) may include a respective logical thread address mapped to physical thread address of the page. The instruction stream 220 may include a compile time virtual-to-physical address mapping of the page. The decoded instruction stream 212 may include a decode time virtual-to-physical address mapping of the page of code. The consistency manager 206 may function as in one or more embodiments as discussed in reference to FIG. 1.

In various embodiments, the consistency manager 206 may detect a modification in the source code 208 corresponding to a binary translated instruction, where the source code may be undergoing translation or schedule to be translated. Additionally or alternatively, the consistency manager 206 may detect a modification in compiled and untranslated code (e.g., in the instruction stream 220) corresponding to a binary translated instruction. The consistency manager may detect a modification by comparing the information (e.g., virtual-to-physical mapping or data at a physical page) of a binary translated instruction (e.g., of decoded instruction stream 212) to the corresponding untranslated source instruction at source code 208, at stream 220, and/or exiting the decoder 228 (e.g., before dynamic binary translation at DBT 210).

In one embodiment, an instruction of the instruction stream 220 may be output to the processor 202, e.g., to a front end 226 of the processor 202. The front end 226 may fetch and prepare instructions to be used by other components of the processor 202. The processor 202 may include a dynamic binary translator (DBT) as a separate component (not shown) or as a component of front end 226, e.g., as depicted in FIG. 2. The front end 226 may include a decoder 228, e.g., an instruction decoder to decode an instruction into control signals (e.g., micro-instructions) that control the execution of the instruction. The decoder may output decoded code (e.g., a decoded instruction) to a binary translator (e.g., the DBT 210 of processor 202). The binary translator may translate an instruction (e.g., from instruction stream 220) from a first (e.g., untranslated) format to a second (e.g., translated) format. In one embodiment, the translated, decoded instruction stream 212 may be output from the DBT 210 and may include a virtual address-to-physical address mapping (e.g., a translation time mapping) between a virtual page and a physical page.

The consistency manager 206 may detect a modification in untranslated code (e.g., not translated by the DBT). In one embodiment, the consistency manager includes memory or access to memory to store a translation time virtual address-to-physical address mapping for a binary translated instruction of a page in the code. In one embodiment, a binary translated instruction includes a field that indicates the translation time virtual address-to-physical address mapping for the page.

Additionally or alternatively, the consistency manager 206 may detect a modification to the data at a physical address (e.g., for a page). For example, a consistency manager may detect a modification (e.g., a store) to an instruction at the physical address and/or to data saved at the physical address. In one embodiment, a binary translated instruction has a virtual-to-physical address mapping (e.g., determined at binary translation time) and the consistency manager 206 may detect a modification (e.g., between binary translation time and run time) to data at that physical address for the code page. For example, a consistency manager may include a connection to monitor physical addresses (e.g., in cache or system memory). For example, the consistency manager 206 may determine, via a snoop hit, that the physical address has been modified. The snoop hit may be a modified ("dirty") as opposed to non-modified (e.g., "clean") hit. In one embodiment, the "execution time" virtual-to-physical address mapping may be determined by rechecking code (e.g., source code 208, compiled code at instruction stream 220, and/or decoded code output from decoder 228) to detect whether the mapping for the page has since changed. And, if the mapping has changed, the consistency manager 206 may determine whether the change blocks the code from executing correctly.

In various embodiments, the consistency manager 206 may initiate a corrective action on detection of a modification. In one embodiment, the consistency manager 206 may detect a modification corresponding to a binary translated instruction and then block execution of the binary translated instruction, e.g., stop the binary translated instruction from being passed to the execution unit 204. Alternatively, or additionally, the consistency manager may control the execution of instructions (e.g., by control of the execution unit 204) to block execution of the binary translated instruction. In one embodiment, a binary translated instruction of the instruction stream 212 may flow into the consistency manager 206 for it to test the binary translated instruction for a modification and block the modified binary translated instruction from being input into execution unit 204.

More specifically, in one embodiment, the consistency manager 206 may detect a modification corresponding to a binary translated instruction, block execution of the binary translated instruction, and provide the modified, untranslated instruction to the execution unit 204 (e.g., from untranslated source code form the code 208 or from untranslated compiled code within the instruction stream 220). The consistency manager 206 may detect a modification corresponding to a binary translated instruction, block execution of the binary translated instruction, and cause the DBT 210 to re-translate the modified, untranslated instruction (e.g., from untranslated code) to a modified, binary translated instruction (e.g., in instruction stream 212). For example, the modified, binary translated instruction in the instruction stream 212 may flow into the execution unit 204 for execution or into the consistency manager 206 (e.g., for no additional modification check before being passed into execution unit 204 or an additional modification check). A scheduler (not shown) may assign an instruction to the execution unit 204 and the consistency manager 206 may include or control the scheduler. In one embodiment, the DBT may include instructions that execute, e.g., to perform the detection and/or cause the corrective action to begin or complete.

Figure 3:
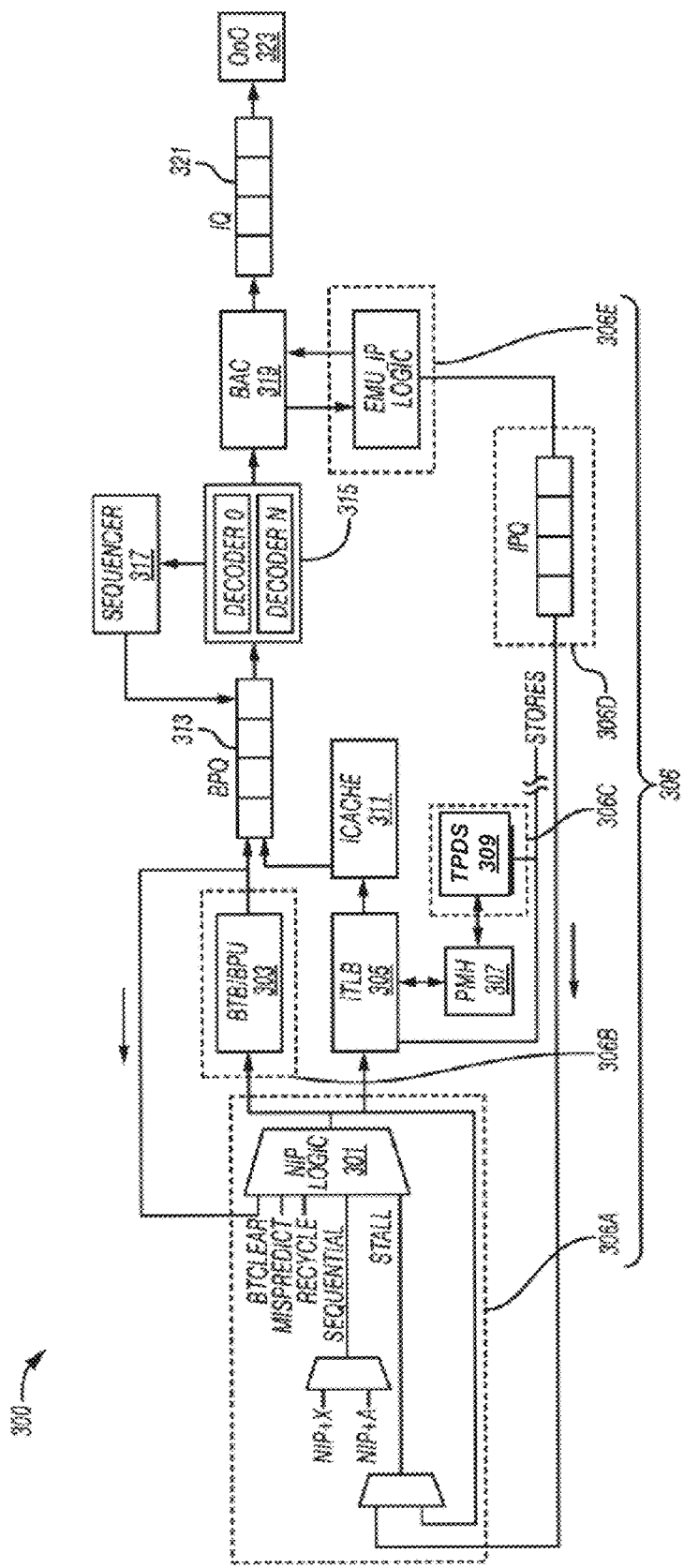
FIG. 3 is a block diagram of a circuit to block execution of a modified instruction, according to embodiments of the present disclosure.

FIG. 3 is a block diagram of a circuit 300 to block execution of a modified instruction, according to embodiments of the present disclosure. In certain instances, the terms page and address may be used interchangeably. System may include a consistency manager 306. The consistency manager 306 may include any one or any combination of the components shown in FIG. 3, to include a next instruction logic 306A, a branch target buffer (BTB)/branch prediction unit (BPU) 306B, a translation protection data structure (TPDS) 306C, a queue of instruction pointer data (IPQ) 306D, and an emulated instruction pointer (EMU_IP) logic 306E. An instruction pointer may be any size (e.g., 16-bit, 32-bit, 64-bit, etc.).

In order to track which physical page (e.g., x86 page) the current translated instruction is coming from, a dynamic binary translator (DBT) may determine the current physical page for the translated instruction and the physical page for the translated instruction assumed by the DBT at translation time. The tracking of the physical page may be facilitated with insertion of one or more specific sequences of instructions to be executed into an instruction stream. The insertion may be performed by two instructions, e.g., discussed herein as a make-an-instruction pointer (MKIP) and translate (X), compare, and trap (XCATNE). In alternative embodiments, the MKIP and XCATNE instructions may be a single, combined instruction. The MKIP instruction may set an emulated instruction pointer (EMU_IP) to a specific value. The XCATNE instruction may check for a modification to a page in original code. The XCATNE may translate an emulated instruction pointer (EMU_IP) using an instruction translation lookaside buffer (iTLB) and perform a compare-and-trap check to determine whether the current virtual-to-physical page mapping matches assumed and/or expected translation of the translated instruction. The MKIP instruction may update the value of the current (e.g., x86) page. The XCATNE instruction may encode the physical page assumed at the point the binary translation was created, e.g., at translation time.

In various embodiments, at least a portion of the circuit 300 of FIG. 3 may be part of any processor disclosed herein. In one embodiment, the circuit 300 is part of a front end (e.g., the front end 226 in FIG. 2) of a processor. A next instruction pointer (NIP) logic 301 may determine the next instruction pointer, e.g., after the current IP, where the current IP may refer to the next instruction to be executed. The NIP logic 301 may output a NIP value to branch target buffer (BTB)/branch prediction unit (BPU) 303 and/or instruction TLB (iTLB) 305. The BTB/BPU 303 may output an instruction's physical address therefrom to the branch prediction queue (BPQ) 313. The iTLB 305 may determine if the instruction pointed to by the NIP (e.g., output from NIP logic 301) corresponds to any instruction in the TLB (e.g., indicating the virtual address-to-physical address mapping for the instruction to which the NIP points). If the instruction to which the NIP points is not present in the iTLB, the NIP may query the page miss handler (PMH) 307 to walk through the page table of the code to find the correct virtual address-to-physical address mapping to which the NIP points. The translation protection data structure (TPDS) 309 (e.g., a table or other storage structure) may be used, for example, to store data indicating a binary translated instruction has not been modified. For the example, the TPDS may indicate that the physical page has not been modified since the binary translation occurred.

With further reference to FIG. 3, the PMH 307 may check the TPDS 309 each time the iTLB accesses the PMH 307. Additionally or alternatively, the consistency manager may cause an update to the TPDS (e.g., indicating that a physical page has been modified and should not be executed) which may cause the iTLB 305 to update its entry for that page. The iTLB 305 and/or BTB/BPU 303 may output a physical address from the iTLB into the BPQ 313. The decoder 315 may decode the instruction located at the physical address, which may be placed back into the BPQ 313 according to the sequencer 317.

In various embodiments, the decoded instruction may be output from the decoder 315 to a branch address calculator (BAC) 319. The BAC 319 may include the EMU_IP logic 306E. The BAC 319 may receive decode information from the decoder 315 (e.g., decode unit) about the decoded instruction. For example, the BAC 319 may identify and predict the outcome of branch instructions such that the NIP logic 301 may retrieve the program instructions required by an execution unit in advance. In the event that the outcome of a branch instruction was predicted incorrectly, the NIP logic 301 may determine the address of the next instruction in the correct path for code execution. The BAC 319 may output the decoded instruction to an execution unit. In the depicted embodiment, the BAC 319 may output the instruction to an instruction queue (IQ) 321, which may then output the decoded instruction to an Out-of-Order (OoO) execution engine 323.

The consistency manager 306 may maintain a register with emulated instruction pointer values (e.g., EMU_IP) and/or a register with emulated physical address (e.g., EMU_PA). These registers may reside in the BAC 319 (e.g., where the BAC calculation is performed after a decode action) and there may be copies of these values at retirement, e.g., to recover from misprediction(s) and/or potential translation rollbacks. When the MKIP and XCATNE instructions pass through the BAC 319, these instructions may speculatively update any BAC copies. When the MKIP and XCATNE instructions retire, these instructions may update the retirement copies. In case of a misprediction, exception, or any other disruption, the retirement copies may be copied to the BAC 319. When a commit instruction retires (e.g., indicating that the translated region completed successfully), the retirement copies may be saved in a third copy of the registers. In case of a translation rollback (e.g., because of static scheduling errors), the commit copies of the registers may be copied, e.g., to both the retirement copies and the BAC copies.

Figure 4:
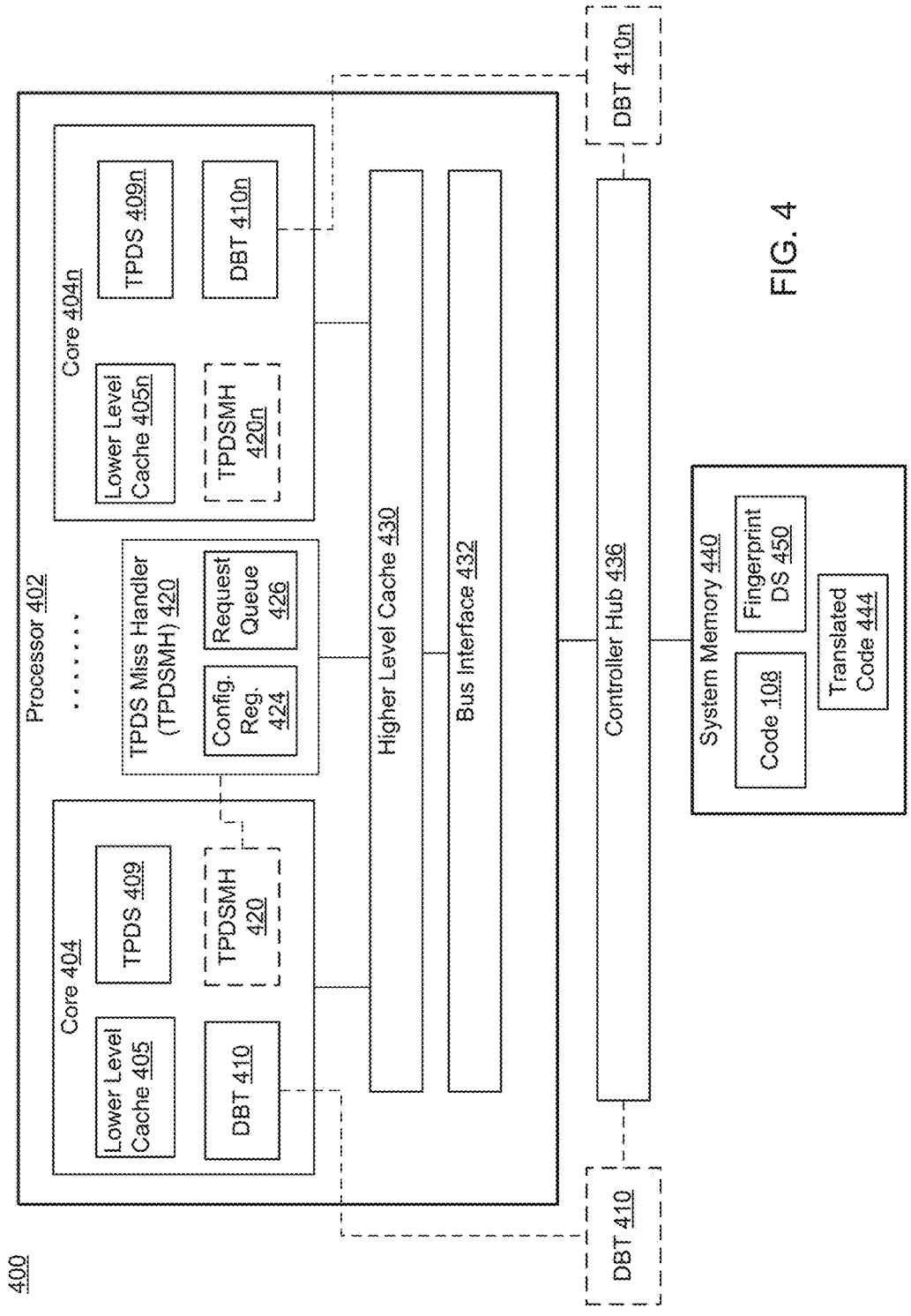
FIG. 4 is a block diagram of a system that uses hardware miss handling to fill a translation protection data structure (TPDS) with a fingerprint data structure, according to embodiments of the present disclosure.

FIG. 4 is a block diagram of a system 400 that uses hardware miss handling to fill a hardware translation protection data structure (TPDS) 409 with a fingerprint data structure 450, according to embodiments of the present disclosure. The system 400 (which may also be referred to herein as system architecture) may include, but not be limited to, a processor 402, optionally a separate dynamic binary translator (DBT) 410 or 410n, a controller hub 436, and system memory 440. The DBT 410 may be any binary translator circuit that may perform dynamic binary translation. The controller hub 436 may control and facilitate communication between the processor 402 and the system memory 440 and other input/output (TO) devices. The system memory 440 may include, for example, code 108, such as original source code, translated code 444 (also referred to as translated page code) from a binary translation of the code 108, and the fingerprint data structure 450.

The processor 402 may include a plurality of cores 404 . . . 404n, a hardware TPDS miss handler 420, higher level cache 430, and a bus interface 432. The bus interface 432 may facilitate data communication with the controller hub 436, and therefore, with the system memory 440 and other IO devices, including any external DBT 410 or 410n. In various embodiments, each core may include lower level cache 405, a DBT 410, the TPDS 409, and optionally the hardware TPDS miss handler (TPDSMH) 420. Accordingly, the last core 404n may include lower level cache 405n, a DBT 410n, a TPDS 409n, and optionally a TPDSMH 420n. The hardware TPDSMH 420 may include a configuration register 424 and a request queue 426.

Referring to the core 404 for explanation purposes, the TPDS 409 may be a hardware structure such as a table or other data structure to store physical page addresses for pages of original code (e.g., in the code 108), which is stored in the memory 440. The TPDS 409 may also observe snoops (e.g., coherency-based messages) of the system memory that invalidate the corresponding entry in the TPDS. When the DBT 410 performs the translation to generate the translated code 444 corresponding to the original code, the DBT 410 may also generate a fingerprint for each page of the code 108. If the DBT 410 is within the core 404, the fingerprint may be generated by the BT system software, and then stored in the fingerprint data structure 450. The fingerprint data structure 450 may be a table or other memory-based storage structure. Later, during execution of the translated code 444, the TPDSMH 420 may generate a computed fingerprint for the page of the code 108 that currently resides in the system memory 440. Generation of the computed fingerprint may be in response to a modification check received from the TPDS 409 due to a miss in the TPDS for a particular physical address. A match between the computed fingerprint and the stored fingerprint indicates there has been no change to the original code and the original code is safe to execute.

In various embodiments, the TPDS 409 may be a hardware-managed, x-way associative structure (such as 4-way, 8-way, or 16-way associativity) employing least recently used (LRU) replacement logic. Alternatively, the least significant bits (such as the least significant two bits) of the way information related to the fingerprint data structure 450 may be used to choose one of the ways in the TPDS 409 at which to store the entry of the physical address (PA) for an original code page.

Figure 6:
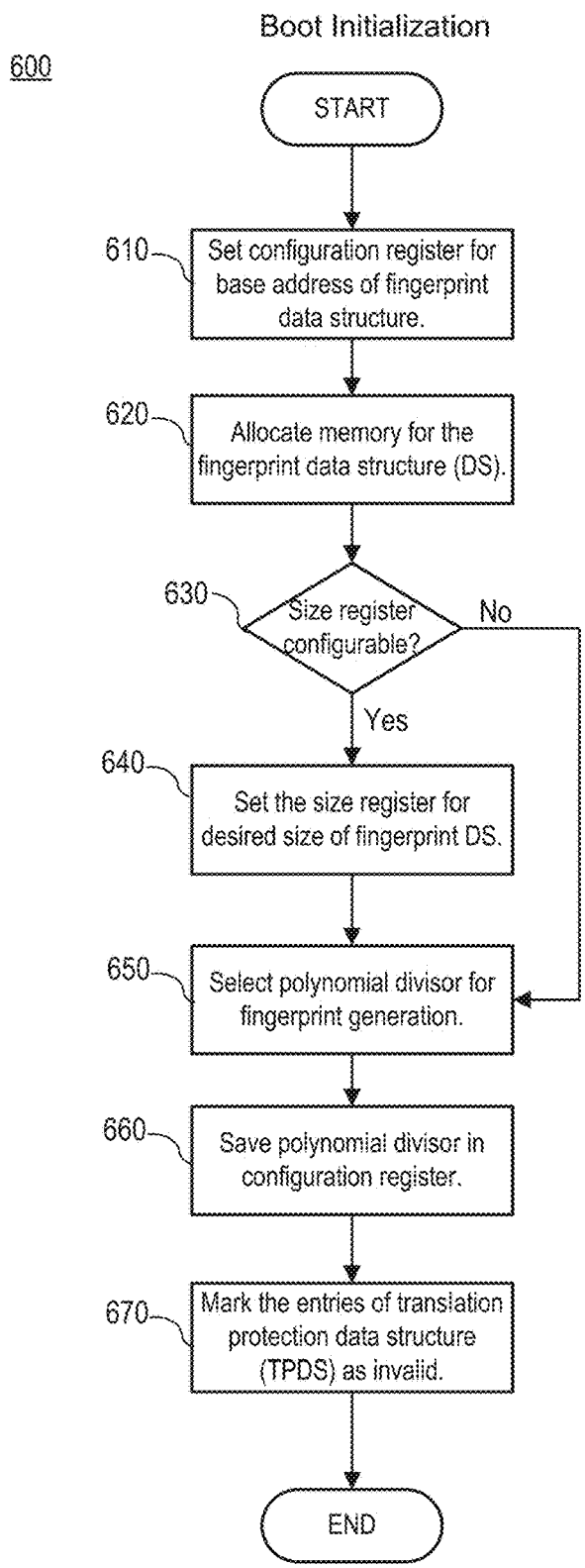
FIG. 6 is a flow chart of a method boot initialization of the system of FIG. 4, according to embodiments of the present disclosure.

Although a cryptographically secure hash function may be used to generate the fingerprint, evasion of self-modifying code (SMC) detection may not be seen as an attack surface of the processor 402. Indeed, if a malicious actor were able to modify the original code, the actor would prefer the SMC detection mechanism to observe his code change, invalidate translations for the original code, and begin executing any malware. Thus, in one embodiment, the fingerprinting may be based on modulo arithmetic using polynomials with binary coefficients, e.g., coefficients zero ("0") and one ("1"), which represent the elements of the Galois field (GF) of size two. The choice of fingerprint algorithm may include any type of algorithm, however. For example, assume an 11-byte fingerprint is chosen. Also, to avoid a break-once-run-everywhere situation in which a specially-crafted SMC/XMC code change is designed to evade the disclosed fingerprint method of detection, the processor 402 may allow for the polynomial divisor to be initialized randomly on different platforms and at boot initialization (FIG. 6). Such fingerprint generation may be performed using known algorithms for creating an 88th-degree irreducible polynomial, or by multiplying a 64th-degree irreducible polynomial (such as CRC64) with a randomly-chosen 24th-degree polynomial. Other algorithms and/or polynomials are envisioned for performing the fingerprint generation.

More specifically, the hardware TPDS miss handler 420 may set its configuration register 424, upon boot initialization of the processor 402 (or system 400), for a base address of the fingerprint data structure in the memory. The hardware TPDS miss handler 420 may also allocate a portion of the memory 440 for the fingerprint data structure, select a polynomial divisor for generation of the computed fingerprint, and store the polynomial divisor in the configuration register.

Figure 5:
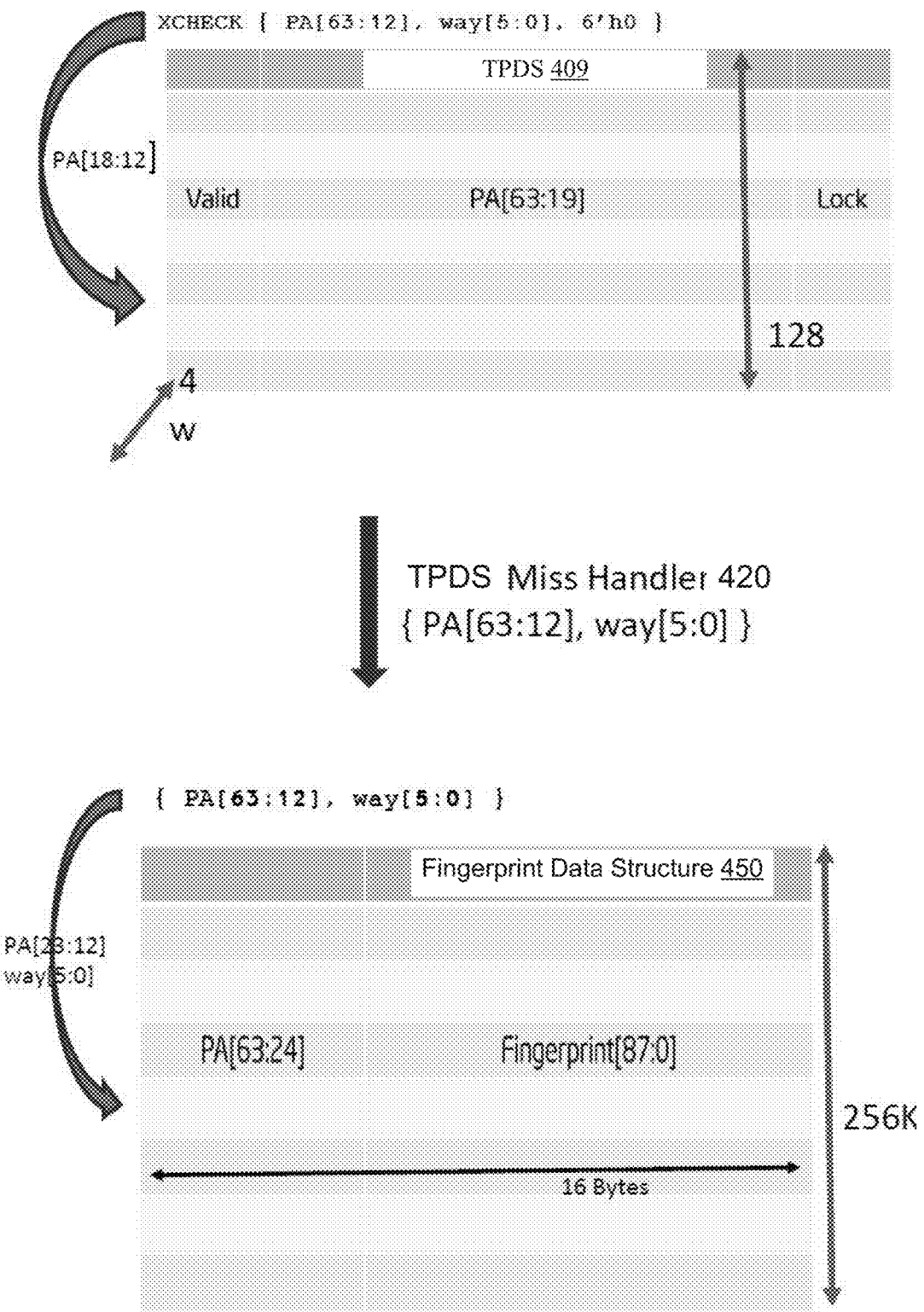
FIG. 5 is a flow diagram of use of the TPDS and the fingerprint data structure of FIG. 4, according to an embodiment of the present disclosure.

FIG. 5 is a flow diagram of use of the TPDS 409 and the fingerprint data structure 450 of FIG. 4, according to an embodiment of the present disclosure. To provide a numerical-based example, assume the system 400 uses a 64b physical address space and use 4 KB pages. Let the TPDS 409 have 512 entries, with 128 sets and 4-way associativity. The TPDS miss handler 420 may access the fingerprint data structure 450, so the base address for the fingerprint data structure should be recorded in the configuration register 424. The size of the TPDS 409 can also be configured. Assume the fingerprint data structure 450 is composed of 64 ways, each having 4K entries, for a total size of 256K entries. The fingerprint data structure may then require 4 MB of memory and cover 1 GB of original code. The BT system software may populate the fingerprint data structure 450 and can dynamically allocate each way of the data structure, as needed. Each translation may begin with a translation check (XCHECK) instruction, which provides the physical page address (PA) of the original code from which the translation was created and provides the 6-bit (or other sized) way of the fingerprint table in which BT runtime software has stored the fingerprint. Accordingly, the XCHECK instruction may encode the way of the fingerprint data structure with a plurality of way bits. Further reference to these features will be made in more detail with reference to FIGS. 6 through 9.

FIG. 6 is a flow chart of a method 600 of boot initialization of the system of FIG. 4, according to embodiments of the present disclosure. The method 600 may be performed by a process system that may include hardware (e.g., circuitry, dedicated logic, and/or programmable logic), software (e.g., instructions executable on a computer system to perform hardware simulation), or a combination thereof. In an illustrative example, the method 600 may be performed by the processor 402 of FIG. 4. The method 600 and/or each of its functions, routines, subroutines, or operations may be performed by one or more processors of a computing system such as a computing system that shares aspects of the system architecture. Two or more functions, routines, subroutines, or operations of the method 600 may be performed in parallel or in an order which may differ from the order described above.

With reference to FIG. 6, the method 600 may start with the processor 402 setting the configuration register 424 for a base address of the fingerprint data structure 450 (610). The method 600 may continue with the processor allocating memory for the fingerprint data structure (620). The method 600 may continue with the processor determining whether a size register for the fingerprint data structure is configurable (630). The size register may be a model-specific register of the processor 402 and may vary depending on the type of device (e.g., large or small) and may be reset after the device has been placed in operation, e.g., to adjust the size of the fingerprint data structure in memory at a later time. If configurable, the method 600 may continue with the processor setting the size register to a desire size (640). The method 600 may continue with the processor selecting a polynomial divisor for fingerprint generation (650). The method 600 may continue with the processor saving the polynomial divisor in the configuration register 424 (660). The method 600 may continue with the processor 402 marking the entries of the TPDS 409 as invalid (if not already performed by hardware reset, POST, or the like) (670).

Figure 7:
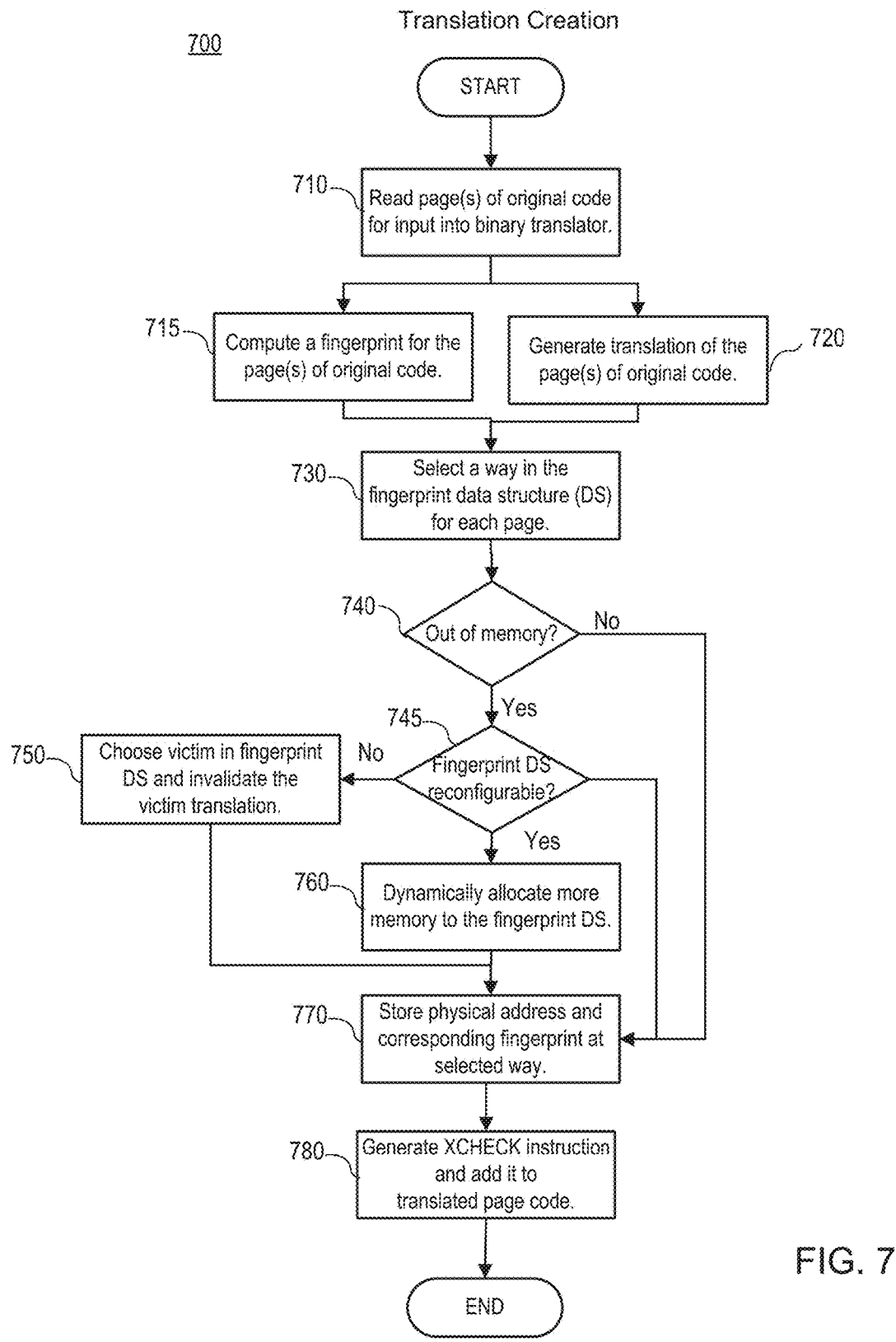
FIG. 7 is a flow chart of a method of translation creation using the system of FIG. 4, according to embodiments of the present disclosure.

FIG. 7 is a flow chart of a method 700 of translation creation using the system of FIG. 4, according to embodiments of the present disclosure. The method 700 may be performed by a process system that may include hardware (e.g., circuitry, dedicated logic, and/or programmable logic), software (e.g., instructions executable on a computer system to perform hardware simulation), or a combination thereof. In an illustrative example, the method 700 may be performed by the system 400 of FIG. 4. In particular the method 700 may be performed, at least in part, by the DBT 410 or 410n of the system 400. The method 700 and/or each of its functions, routines, subroutines, or operations may be performed by one or more processors of a computing system such as a computing system that shares aspects of the system architecture. Two or more functions, routines, subroutines, or operations of the method 700 may be performed in parallel or in an order which may differ from the order described above.

With reference to FIG. 7, the method 700 may start with the core 404 reading pages of original code for input into the dynamic binary translator (DBT) 410 (710). The method 700 may continue with the DBT 410 computing a fingerprint for the pages of original code (715) and generating a translation of the corresponding pages of original code (720). The method 700 may continue with the DBT 410 selecting a way in the fingerprint data structure 450 for each code page (730).

The method 700 may continue with the DBT 410 determining whether the fingerprint data structure 450 is out of memory (740). If yes, then the method 700 may continue with the DBT 410 determining whether the fingerprint data structure is reconfigurable (745). If not reconfigurable, the method 700 may continue with the DBT 410 choosing a victim in the fingerprint data structure and invaliding the victim translation to create room for a new entry (750). If yes, reconfigurable, the method may continue with the DBT 410 dynamically allocating additional memory to the fingerprint data structure (760).

With further reference to FIG. 7, the method 700 may continue with the DBT 410 storing, for each page, the physical address and corresponding fingerprint at the selected way in the fingerprint data structure 450 (770). Further to the example of FIG. 5, the DBT 410 may perform a single, atomic 16B store instruction for each entry in the fingerprint data structure 450. The method 700 may continue with the DBT 410 generating a translation check (XCHECK) instruction and adding the XCHECK instruction to the translated page code for a page (780). Alternatively, the XCHECK instruction may be added to a group of translated code pages for a plurality of translated pages. The XCHECK instruction may include the physical addresses of the original code and the selected way in the fingerprint data structure for the page (or for each page for a range of translated code pages). When executed, the XCHECK instructions may perform the SMC/XMC checks to determine whether page(s) of original code have been modified.

Figure 8:
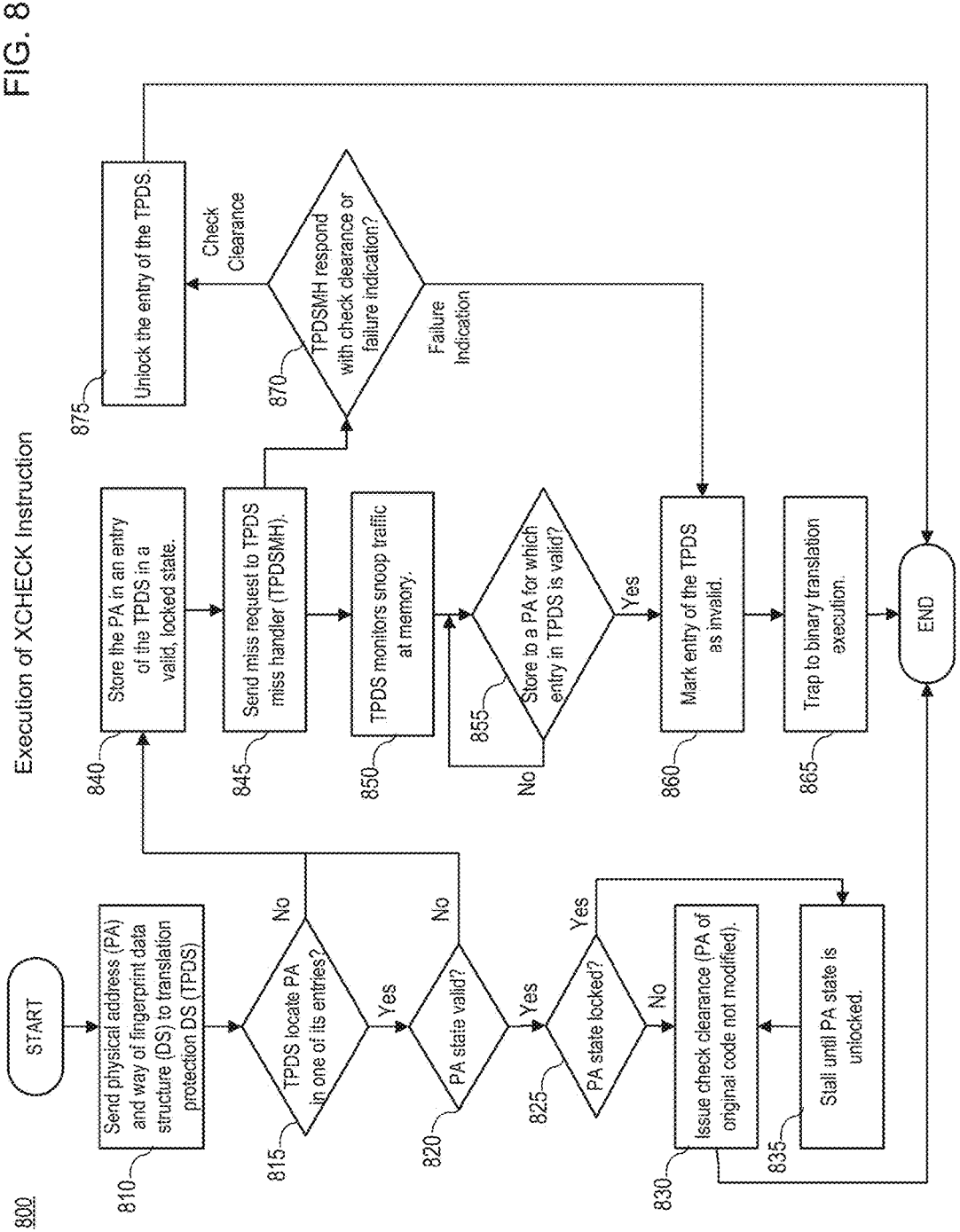
FIG. 8 is a flow chart of a method of execution of a translation check instruction, according to embodiments of the present disclosure.

FIG. 8 is a flow chart of a method 800 of execution of a translation check (XCHECK) instruction, according to embodiments of the present disclosure. The method 800 may be performed by a process system that may include hardware (e.g., circuitry, dedicated logic, and/or programmable logic), software (e.g., instructions executable on a computer system to perform hardware simulation), or a combination thereof. In an illustrative example, the method 800 may be performed by the processor 402 of FIG. 4. In particular, the method 800 may be performed, at least in part, by the core 404 and the TPDS 409. The method 800 and/or each of its functions, routines, subroutines, or operations may be performed by one or more processors of a computing system such as a computing system that shares aspects of the system architecture. Two or more functions, routines, subroutines, or operations of the method 800 may be performed in parallel or in an order which may differ from the order described above.

When the processor 402 executes translated code, the processor may fetch and execute the XCHECK instruction that verifies that the corresponding original code has not been modified from the time when the translation was created. The XCHECK instruction may perform other checks as well, such as verifying the virtual-to-physical page mapping remains unchanged, an execute bit is present on the original code page, verifying Supervisor Mode Execution Protection (SMEP), absence of code breakpoints, and other such checks. The features of the method 800 of FIG. 8, in relation to SMC/XMC checks, may be performed upon execution of the XCHECK instruction.

With reference to FIG. 8, the method 800 may start, upon executing the XCHECK instruction of a translated page code, with the processor sending, to the TPDS 409, the physical address (PA) of the page in the memory and the way of the fingerprint data structure in which has been stored the corresponding fingerprint (810). The PA and the way of the fingerprint data structure 450 may be sent in a modification check request, for example. The XCHECK instruction may optionally include a bit to indicate how many of the following range of pages of translated code to which the XCHECK instruction pertains, and the processor and TPDS may perform the method 800 for each page of that range of pages of the translated code. The method 800 may continue with the TPDS 409 determining whether the PA for the page is located in one of its entries (815). If the answer is yes, the method 800 may continue with the TPDS determining whether a PA state for the physical address is valid (820). If the answer is yes, the method 800 may continue with the TPDS determining whether the PA state is locked (825). If the PA state is not locked, the method 800 may continue with the TPDS issuing a check clearance indication (830). If the PA state is locked, the method 800 may continue with the TPDS stalling until the PA state is unlocked (835) before issuing the check clearance indication (830).

With further reference to FIG. 8, if the answer to block 815 or block 820 is no, the method 800 may continue with the TPDS 409 storing the PA in an entry of the TPDS in a valid, locked state (840). The way of the TPDS 409 at which to store the entry may be selected by hardware, e.g., using LRU replacement or by referencing the least significant bit or bits of the way bits of the way information for the fingerprint data structure. Alternatively, the bits used to encode the way information in an XCHECK instruction may be referenced as priority, with the BT system software assigning lower way values to higher priority translations, or just the opposite, by assigning higher way values to higher priority translations. The method 800 may continue with the TPDS 409 sending a miss request to the TPDS miss handler 420 to handle a miss at the TPDS (845).

With further reference to FIG. 8, the method 800 may continue with the TPDS monitoring snoop traffic at the memory (850). Snoop traffic refers to coherency messages sent by hardware in a multi-core system (such as the system 400) to gain ownership of a location in the memory at which to store data. The snoop traffic may comply with snoop-based coherency protocol to ensure stale data, dirty entries, and invalid entries are properly handled before taking ownership of a memory location. The method 800 may continue with detecting a store operation to a physical address for which a corresponding entry in the TPDS is valid (855). When such a store operation is detected, the method 800 may continue with the TPDS marking the entry in the TPDS for the PA as invalid (even if the entry is locked) (860), and the XCHECK instruction may trap to the binary translation execution of the BT system software (865). To perform such a trap, the core 404 may generate a processor interrupt that directs the processor to start executing the BT software code route pre-configured for the interrupt.

The method 800 of FIG. 8 may continue after block 845 with the TPDS 409 also determining whether the TPDSMH 420 has responded to the miss request with a check clearance indication or a failure indication (870). If a check clearance indication, the method 800 may continue with the TPDS unlocking the entry of the page in the TPDS (875). If a failure indication, the method 800 may continue with the TPDS marking the entry of the TPDS for the page as invalid (even if the entry is locked) (860), and the XCHECK instruction may trap to the binary translation execution of the BT system software (865).

Figure 9:
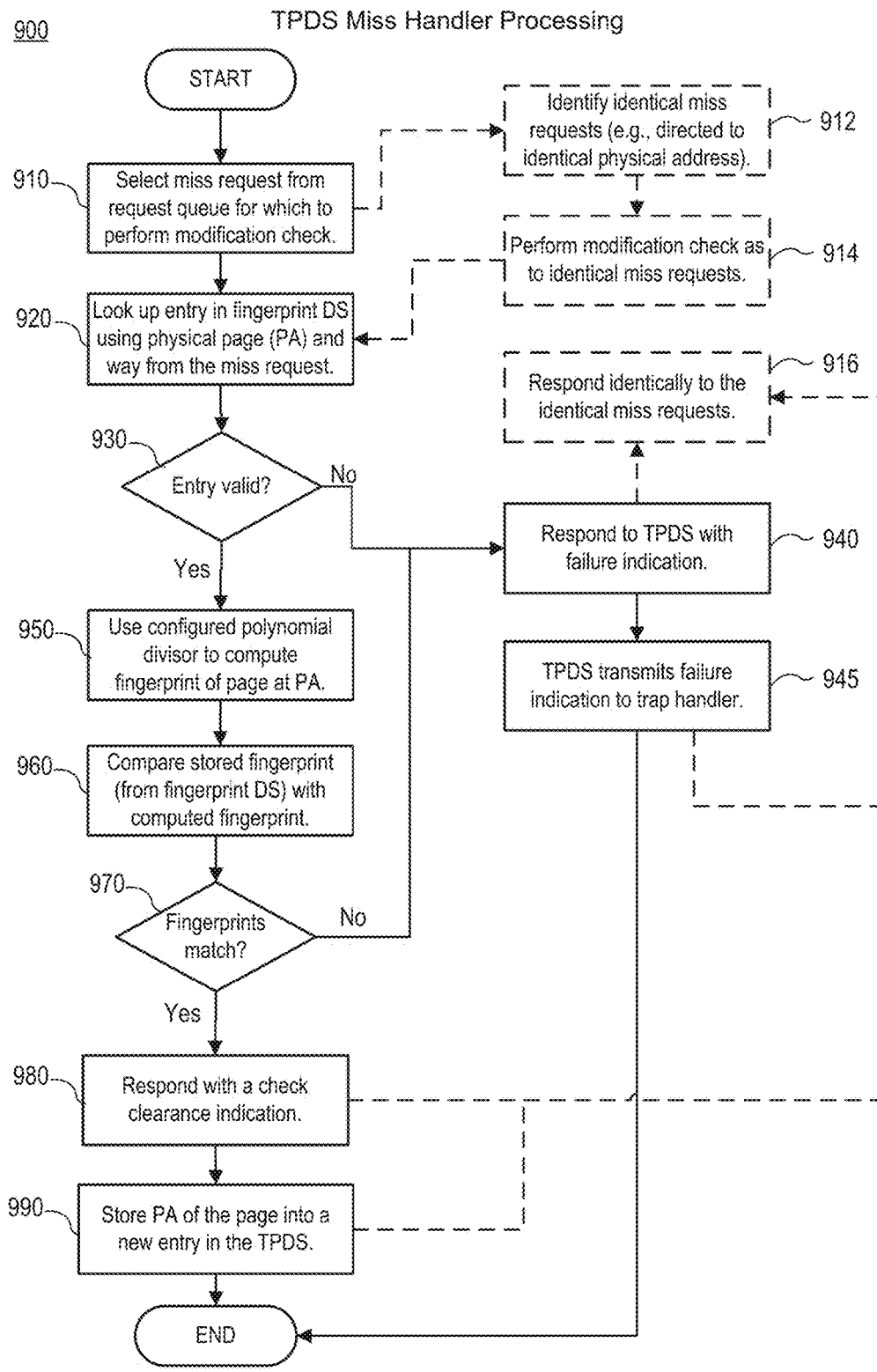
FIG. 9 is a flow chart of a method for processing of a hardware TPDS miss handler, according to embodiments of the present disclosure.

FIG. 9 is a flow chart of a method 900 for processing of a hardware TPDS miss handler 420, according to embodiments of the present disclosure. The method 900 may be performed by a process system that may include hardware (e.g., circuitry, dedicated logic, and/or programmable logic), software (e.g., instructions executable on a computer system to perform hardware simulation), or a combination thereof. In an illustrative example, the method 900 may be performed by the processor 402 of FIG. 4. In particular the method 900 may be performed, at least in part, by the hardware TPDS miss handler (TPDSMH) 420. The method 900 and/or each of its functions, routines, subroutines, or operations may be performed by one or more processors of a computing system such as a computing system that shares aspects of the system architecture. Two or more functions, routines, subroutines, or operations of the method 900 may be performed in parallel or in an order which may differ from the order described above.

With reference to FIG. 9, the method 900 may begin with the TPDSMH 420 selecting a miss request from a request queue 426 of the TPDSMH for which to perform a modification check (910). Recall from FIG. 8 that the TPDS earlier sent the miss request to the TPDSMH responsive to the physical address (PA) not being present in the TPDS. Accordingly, this miss request may also include the PA of the original code and the way of the fingerprint data structure 450. The TPDSMH 420 may then queue each miss request in the request queue 426, so that the TPDSMH may handle each miss request in turn, and optionally process multiple miss requests, from multiple cores, in parallel at the same time. Note that the sizes of the disclosed hardware in FIG. 5 may result in a miss request to the TPDSMH having the same number of bits (PA plus the way) as a cache request to an uncore last-level cache for a 64b cache line.

The method 900 of FIG. 9 may optionally, when multiple miss requests are queued in the request queue 426, continue with the TPDSMH 420 identifying identical miss requests in the request queue, e.g., directed to the identical physical address (912). The method 900 may continue with the TPDSMH performing the modification check as to the identical miss requests (e.g., at least contain an identical physical page) (914) and responding identically to the identical miss requests (916), as will be detailed below (see dashed lines for this optional embodiment).

The method 900 may continue with the TPDSMH looking up the entry in the fingerprint data structure 450 using the PA and the way from the miss request (920). The method 900 may continue with the TPDSMH determining whether the entry is valid (930). Note that an invalid entry may be encoded in any of various ways. For example, if an unused PA bit is available, then it may be used as a valid bit. Or, having both a PA tag and a fingerprint of zero could be used to indicate an invalid entry. If the PA entry is invalid, the method 900 may continue with the TPDSMH responding to the TPDS with a failure indication (940). The method may continue with the TPDS 409 transmitting a failure indication to a trap handler (945). The trap handler may cause the processor to trap to binary translation execution of the BT system software for the XCHECK instruction that initiated the subject check modification request (so the BT software may invalidate this PA entry in the fingerprint data structure). To perform such a trap, the core 404 may generate a processor interrupt that directs the processor to start executing the BT software code route pre-configured for the processor interrupt.

With further reference to FIG. 9, if the entry in the TPDS is valid (930), then the method 900 may continue with the TPDSMH 420 using the configured polynomial divisor (stored in the configuration register 424) to compute a fingerprint of the page currently located at the PA in the memory (950). The method 900 may continue with the TPDSMH comparing the stored fingerprint in the fingerprint data structure with the computed fingerprint (960) and determining whether the fingerprints match (970). If the fingerprints do not match, the method 900 may continue with the TPDSMH responding to the TPDS with a failure indication (940) and the TPDS 409 transmitting a failure indication to a trap handler (945), as before. If the fingerprints do match, the method 900 may continue with the TPDSMH responding to the TPDS with a check clearance indication (980) and storing the PA of the page into a new entry in the TPDS (990).

FIG. 10A is a block diagram illustrating a micro-architecture for a processor 1000 to perform operations of a processor or an integrated circuit that may employ the hardware TPDS miss handler 420 and fingerprint data structure 450, according to an embodiment. Specifically, processor 1000 depicts an in-order architecture core and a register renaming logic, out-of-order issue/execution logic to be included in a processor according to at least one embodiment of the disclosure.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like. In one embodiment, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different scheduler circuits, including reservations stations (RS), central instruction window, etc. The scheduler unit(s) 1056 is coupled to the physical register set(s) unit(s) 1058. Each of the physical register set(s) units 1058 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1058 is overlapped by the retirement unit 1054 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register set(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register set(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 10B is a block diagram illustrating an in-order pipeline and a register renaming stage, out-of-order issue/execution pipeline implemented by processor 1000 of FIG. 10A according to some embodiments of the disclosure. The solid lined boxes in FIG. 10B illustrate an in-order pipeline 1001, while the dashed lined boxes illustrate a register renaming, out-of-order issue/execution pipeline 1003. In FIG. 10B, the pipelines 1001 and 1003 include a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 10B.

Figure 11:
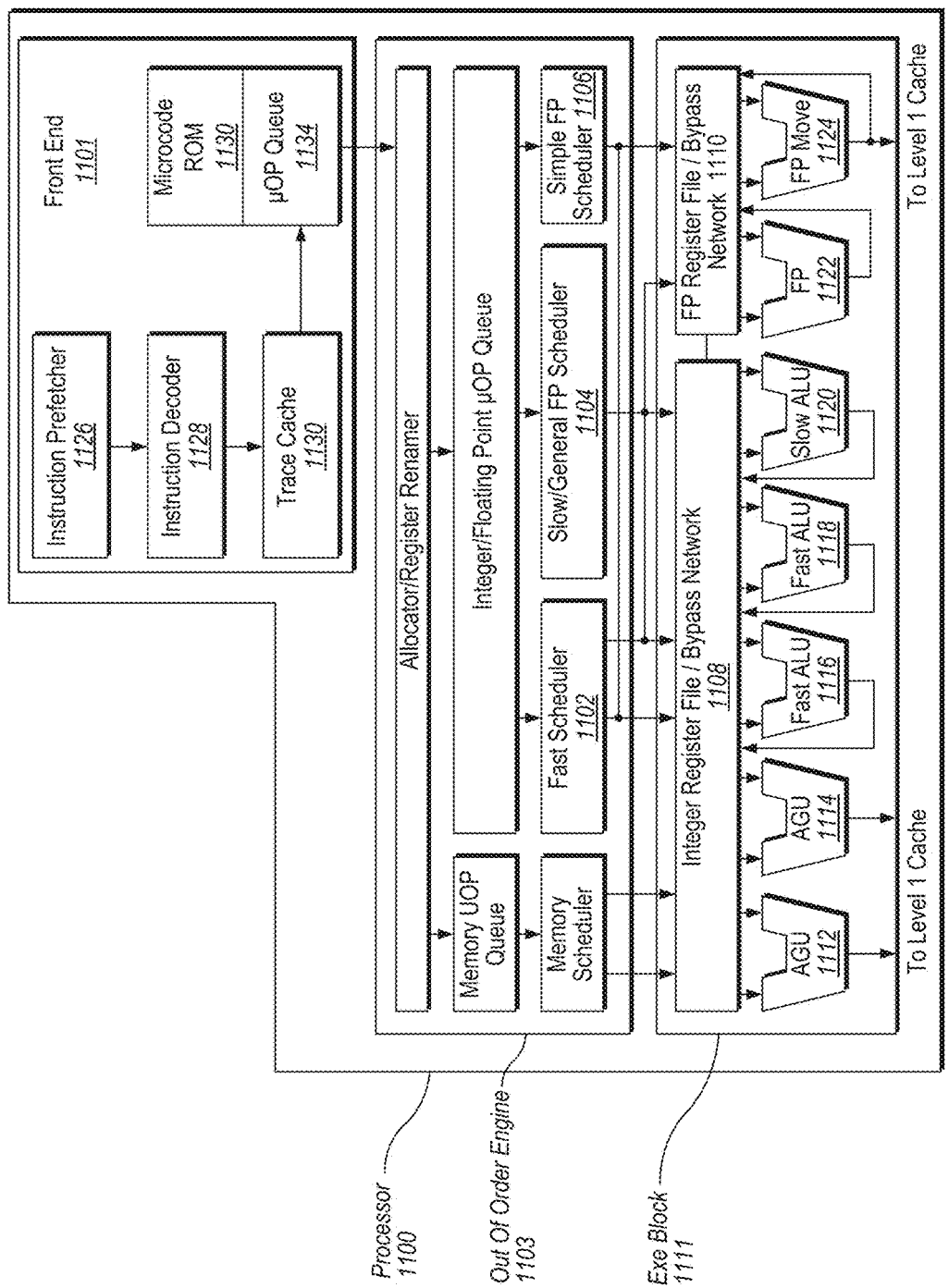
FIG. 11 illustrates a block diagram of the micro-architecture for a processor or an integrated circuit that may employ the hardware TPDS miss handler and fingerprint data structure, according to an embodiment of the present disclosure.

FIG. 11 illustrates a block diagram of the micro-architecture for a processor 1100 that includes logic circuits of a processor or an integrated circuit that may employ the hardware TPDS miss handler 420 and fingerprint data structure 450, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments of the page additions and content copying can be implemented in processor 1100.

The front end 1101 may include several units. In one embodiment, the instruction prefetcher 1116 fetches instructions from memory and feeds them to an instruction decoder 1118 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, microcode ROM (or RAM) 1132 provides the uops needed to complete the operation.

Some instructions are converted into a single micro-op, whereas others need several micro-ops to complete the full operation. In one embodiment, if more than four micro-ops are needed to complete an instruction, the decoder 1118 accesses the microcode ROM 1132 to do the instruction. For one embodiment, an instruction can be decoded into a small number of micro ops for processing at the instruction decoder 1118. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register sets 1108, 1110, sit between the schedulers 1102, 1104, 1106, and the execution units 1112, 1114, 1116, 1118, 1120, 1122, 1124 in the execution block 1111. There is a separate register set 1108, 1110, for integer and floating point operations, respectively. Each register set 1108, 1110, of one embodiment also includes a bypass network that can bypass or forward just completed results that have not yet been written into the register set to new dependent uops. The integer register set 1108 and the floating point register set 1110 are also capable of communicating data with the other. For one embodiment, the integer register set 1108 is split into two separate register sets, one register set for the low order 32 bits of data and a second register set for the high order 32 bits of data. The floating point register set 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register sets 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1120, floating point ALU 1112, floating point move unit 1114. For one embodiment, the floating point execution blocks 1112, 1114, execute floating point, MMX, SIMD, and SSE, or other operations. The floating point ALU 1112 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1122, 1124. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 12:
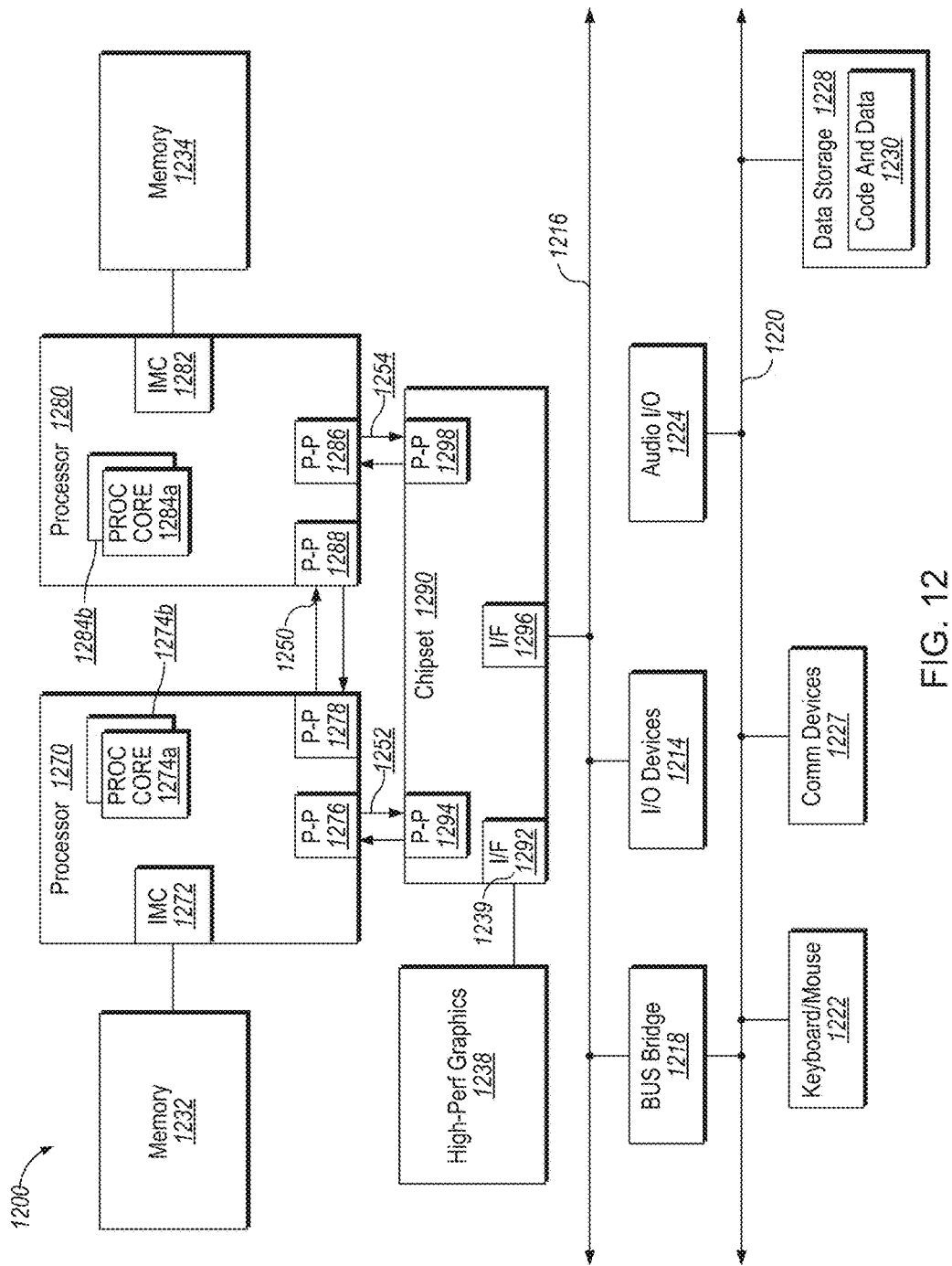
FIG. 12 is a block diagram of a computer system according to one implementation.

Embodiments may be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores (i.e., processor cores 1274a and 1274b and processor cores 1284a and 1284b), although potentially many more cores may be present in the processors. While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

Chipset 1290 may be coupled to a first bus 1216 via an interface 1296. In one embodiment, first bus 1216 may be a Peripheral Component Interconnect (PCI) bus, or a bus such as a PCI Express bus or interconnect bus, although the scope of the present disclosure is not so limited.

Figure 13:
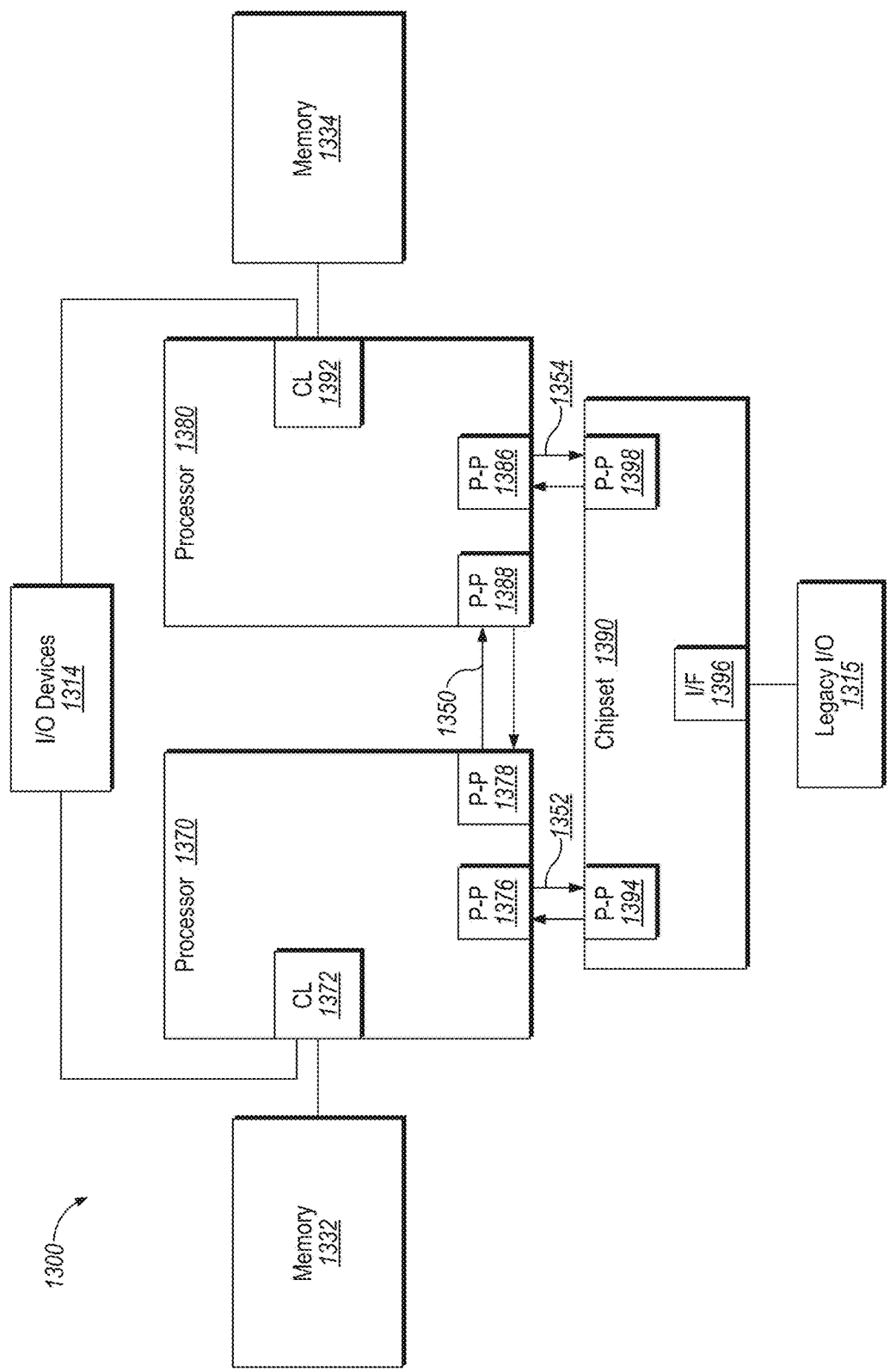
FIG. 13 is a block diagram of a computer system according to another implementation.

Referring now to FIG. 13, shown is a block diagram of a third system 1300 in accordance with an embodiment of the present disclosure. Like elements in FIGS. 12 and 13 bear like reference numerals and certain aspects of FIG. 13 have been omitted from FIG. 12 in order to avoid obscuring other aspects of FIG. 13.

FIG. 13 illustrates that the processors 1370, 1380 may include integrated memory and I/O control logic ("CL") 1372 and 1392, respectively. For at least one embodiment, the CL 1372, 1382 may include integrated memory controller units such as described herein. In addition. CL 1372, 1392 may also include I/O control logic. FIG. 13 illustrates that the memories 1332, 1334 are coupled to the CL 1372, 1392, and that I/O devices 1314 are also coupled to the control logic 1372, 1392. Legacy I/O devices 1315 are coupled to the chipset 1390.

Figure 14:
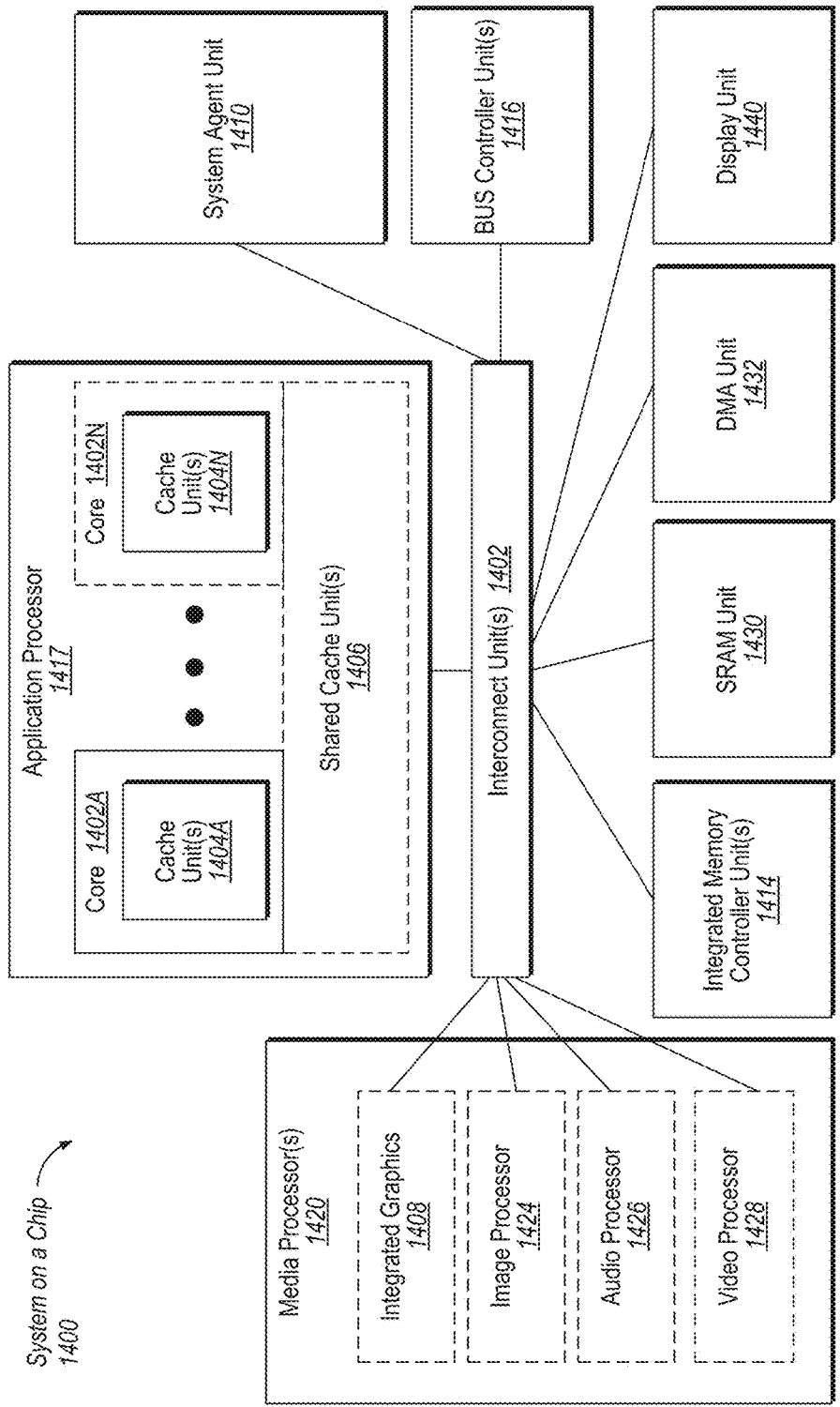
FIG. 14 is a block diagram of a system-on-a-chip according to one implementation.

FIG. 14 is an exemplary system on a chip (SoC) 1400 that may include one or more of the cores 1402A . . . 1402N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1400 of FIG. 14, dashed lined boxes are features on more advanced SoCs. An interconnect unit(s) 1402 may be coupled to: an application processor 1417 which includes a set of one or more cores 1402A-N and shared cache unit(s) 1406; a system agent unit 1410; a bus controller unit(s) 1416; an integrated memory controller unit(s) 1414; a set of one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays.

Figure 15:
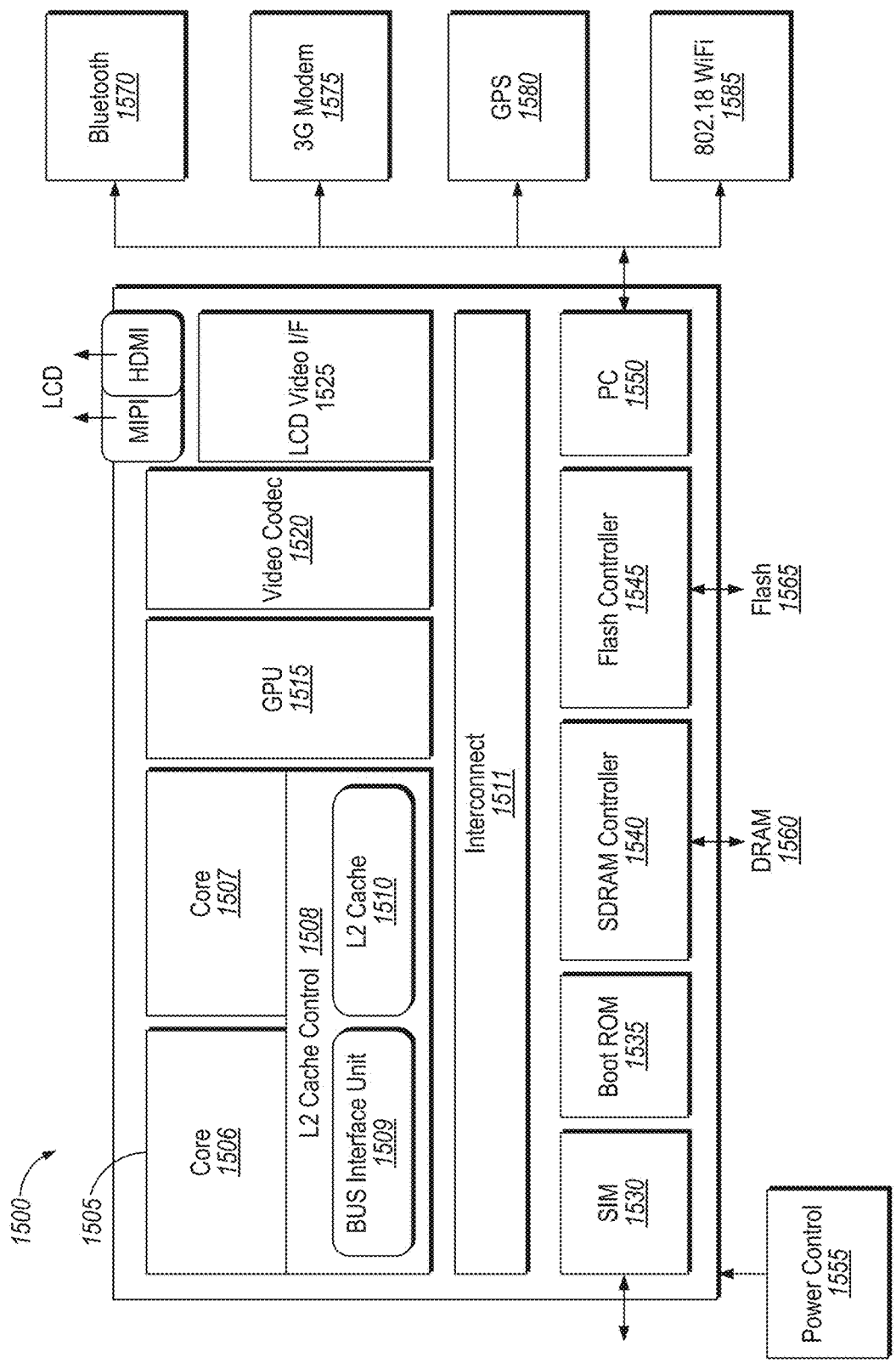
FIG. 15 illustrates another implementation of a block diagram for a computing system.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

In one embodiment, SDRAM controller 1540 may connect to interconnect 1511 via cache 1510. Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth® module 1570, 3G modem 1575, GPS 1580, and Wi-Fi® 1585. Note as stated above, a UE includes a radio for communication. As a result, these peripheral communication modules may not all be included. However, in a UE some form of a radio for external communication should be included.

Figure 16:
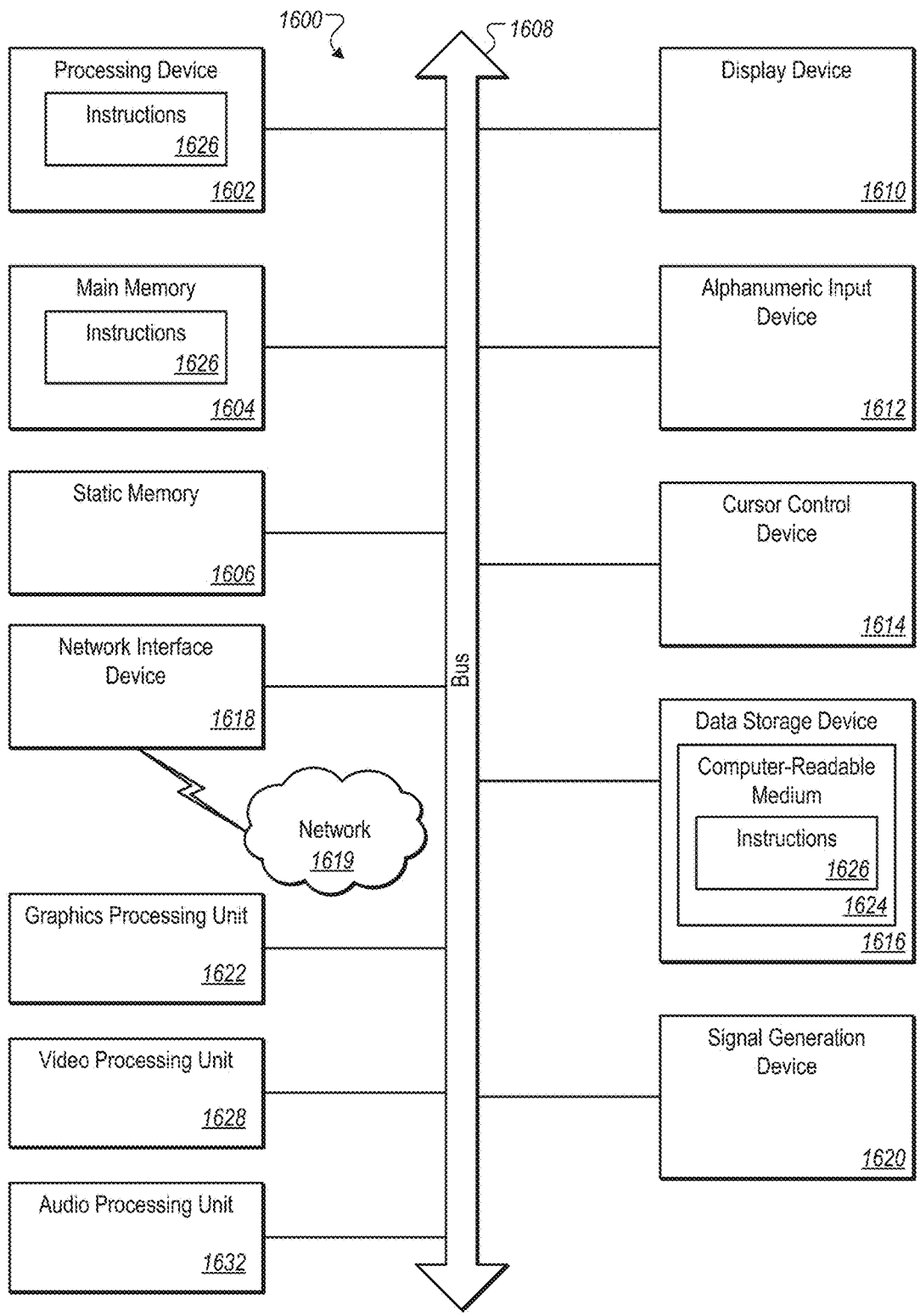
FIG. 16 illustrates another implementation of a block diagram for a computing system.

FIG. 16 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1600.

The computing system 1600 includes a processing device 1602, main memory 1604 (e.g., flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application-specific integrated circuit (ASIC), a field programmable gate array (FPGA), a digital signal processor (DSP), network processor, or the like. In one embodiment, processing device 1602 may include one or more processor cores. The processing device 1602 is configured to execute the processing logic 1626 for performing the operations discussed herein.

In one embodiment, processing device 1602 can be part of a processor or an integrated circuit that includes the disclosed LLC caching architecture. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1618 communicably coupled to a network 1619. The computing system 1600 also may include a video display device 1610 (e.g., a liquid crystal display (LCD) or a cathode ray tube (CRT)), an alphanumeric input device 1612 (e.g., a keyboard), a cursor control device 1614 (e.g., a mouse), a signal generation device 1620 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1616 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic during execution thereof by the computing system 1600; the main memory 1604 and the processing device 1602 also constituting computer-readable storage media.

The computer-readable storage medium 1624 may also be used to store instructions 1626 utilizing the processing device 1602, and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is processor comprising: 1) a memory to store original code and a fingerprint data structure, the fingerprint data structure to store, in a way of the fingerprint data structure, an entry comprising a physical address for a page of the original code and a stored fingerprint generated from the page of the original code; 2) a core coupled to the memory, the core including a translation protection data structure (TPDS) to detect modification to the page of the original code, wherein the core is to, upon execution of a translation check instruction included within a translated page code corresponding to the page, transmit, to the TPDS, a modification check request comprising the physical address of the page in the memory and the way of the fingerprint data structure; and 3) a hardware TPDS miss handler coupled to the core, the hardware TPDS miss handler to process a miss request received from the TPDS responsive to the physical address not being present in the TPDS, wherein to process the miss request, the hardware TPDS miss handler is to: a) generate a computed fingerprint of the page located at the physical address; and b) responsive to the computed fingerprint being a match to the stored fingerprint located in the fingerprint data structure: i) respond to the TPDS with a check clearance indication; and ii) store the physical address of the page into a new entry of the TPDS.

In Example 2, the processor of Example 1, further comprising 1) a binary translator circuit coupled to the core, the binary translator circuit to: a) translate, using binary translation, a page of the original code to the translated page code; and b) generate the stored fingerprint via a computation, on the page of the original code, of modulo arithmetic using polynomials with binary coefficients.

In Example 3, the processor of Example 1, wherein the core is further to: a) translate, using binary translation, a page of the original code to the translated page code; and b) generate the stored fingerprint via a computation, on the page of the original code, of modulo arithmetic using polynomials with binary coefficients.

In Example 4, the processor of Example 1, wherein the core is further to: a) select the way of the fingerprint data structure; b) store the physical address and the stored fingerprint in the way of the fingerprint data structure; and c) add the translation check instruction to the translated page code, the translation check instruction to contain the physical address of the original code in the memory and the way of the fingerprint data structure.

In Example 5, the processor of Example 1, wherein the miss request includes the physical address of the original code and the way of the fingerprint data structure, and wherein the hardware TPDS miss handler is further to: a) select the miss request from a plurality of miss requests in a request queue; b) look up the entry in the fingerprint data structure using the physical address and the way; and c) responsive to the entry being invalid, respond to the TPDS with a failure indication.

In Example 6, the processor of Example 1, wherein the hardware TPDS miss handler comprises a configuration register, wherein upon boot initialization of the processor, the core is further to: a) set the configuration register for a base address of the fingerprint data structure in the memory; b) allocate a portion of the memory for the fingerprint data structure; c) select a polynomial divisor for generation of the computed fingerprint; and d) store the polynomial divisor in the configuration register.

Various embodiments may have different combinations of the structural features described above. For instance, all optional features of the processors and methods described above may also be implemented with respect to a system described herein and specifics in the examples may be used anywhere in one or more embodiments.

Example 7 is a system on a chip (SoC) comprising: 1) a memory to store original code and a fingerprint data structure, the fingerprint data structure to store, in a way selected within the fingerprint data structure, an entry comprising a physical address for a page of the original code and a fingerprint generated from the page; 2) a binary translator circuit coupled to the memory, the binary translator circuit to translate, using binary translation, the page of the original code to a translated page code; 3) a core coupled to the memory and the binary translator circuit, the core including a translation protection data structure (TPDS) to detect modification to the page of the original code, wherein the core is to, upon execution of a translation check instruction included within the translated page code, transmit, to the TPDS, a modification check request comprising the physical address of the page in the memory and the way selected within the fingerprint data structure; and 4) a hardware TPDS miss handler coupled to the core, the hardware TPDS miss handler to queue a miss request received from the TPDS responsive to the physical address not being present in the TPDS.

In Example 8, the SoC of Example 7, wherein the binary translator circuit is further to generate the fingerprint via a computation, on the page of the original code, of modulo arithmetic using polynomials with binary coefficients.

In Example 9, the SoC of Example 7, wherein the hardware TPDS miss handler is further to process a plurality of miss requests in parallel, the plurality of miss requests received from a plurality of cores, wherein the core is one of the plurality of cores.

In Example 10, the SoC of Example 7, wherein the core is one of plurality of cores, each of which contains a TPDS, wherein the hardware TPDS miss handler comprises a request queue to queue a plurality of miss requests from the plurality of cores, and wherein the hardware TPDS miss handler is further to: a) analyze the plurality of miss requests located in the request queue to identify identical miss requests, associated with an identical physical page, received from more than one TPDS; b) perform a modification check in relation to the identical miss requests; and c) respond identically to the identical miss requests from the more than one TPDS.

In Example 11, the SoC of Example 7, wherein the miss request also includes the physical address of the original code and the way of the fingerprint data structure, and wherein the hardware TPDS miss handler is further to: a) select the miss request from a plurality of miss requests in a request queue; b) look up the entry in the fingerprint data structure using the physical address and the way; and c) responsive to the entry being invalid, respond to the TPDS with a failure indication.

In Example 12, the SoC of Example 7, wherein the fingerprint comprises a stored fingerprint, wherein the miss request also includes the physical address of the original code and the way of the fingerprint data structure, and wherein the hardware TPDS miss handler is further to: a) select the miss request from a plurality of miss requests in a request queue; b) look up the entry in the fingerprint data structure using the physical address and the way; c) generate a computed fingerprint of the page at the physical address using a polynomial divisor stored in a configuration register of the hardware TPDS miss handler; and d) compare the computed fingerprint with the stored fingerprint located in the fingerprint data structure.

In Example 13, the SoC of Example 12, wherein responsive to the computed fingerprint being a match to the stored fingerprint, the hardware TPDS miss handler is further to: a) respond to the TPDS with a check clearance indication; and b) store the physical address of the page into a new entry of the TPDS.

In Example 14, the SoC of Example 12, wherein responsive to the computed fingerprint not being a match to the stored fingerprint, respond to the TPDS with a failure indication, and wherein the TPDS is further to transmit the failure indication to a trap handler for the translation check instruction, and wherein the binary translator circuit is to invalidate the entry in the fingerprint data structure in response to the failure indication.

Various embodiments may have different combinations of the structural features described above. For instance, all optional features of the processors and methods described above may also be implemented with respect to a system described herein and specifics in the examples may be used anywhere in one or more embodiments.

Example 15 is a processor comprising: 1) a memory to store original code and a fingerprint data structure; and 2) a core coupled to the memory, the core to: a) translate, using binary translation, a page of the original code to a translated page code; b) compute a fingerprint of the page of the original code; c) store the fingerprint and a physical address for the page in a way selected within the fingerprint data structure; and d) add a translation check instruction to the translated page code, the translation check instruction to contain the physical address for the page in the memory and the way of the fingerprint data structure, wherein when executed, the translation check instruction is to cause the core to perform a check as to modification to the page of the original code.

In Example 16, the processor of Example 15, wherein to compute the fingerprint, the core is to perform, on the page of the original code, modulo arithmetic using polynomials with binary coefficients.

In Example 17, the processor of Example 15, wherein the core further comprises a translation protection data structure (TPDS) to detect modification to the page of the original code, wherein the core is further to, upon execution of the translation check instruction, transmit, to the TPDS, a modification check request comprising the physical address of the original code and the way of the fingerprint data structure.

In Example 18, the processor of Example 17, wherein the TPDS comprises a hardware-managed, set-associative storage structure that is to employ least recently used (LRU) replacement logic.

In Example 19, the processor of Example 17, wherein the way of the fingerprint data structure is encoded within a plurality of way bits of the translation check instruction, and wherein the core is further to one of: a) select a second way within the TPDS, for access to the physical address, based on one or more of the least significant bits of way bits; or b) select the second way based on a priority encoded within the plurality of way bits.

In Example 20, the processor of Example 17, wherein the TPDS is further to: a) access the physical address in the TPDS; b) responsive to the physical address being located in a valid, unlocked state, issue a check clearance; and c) responsive to the physical address being located in a valid, locked state, stall until the physical address is unlocked.

In Example 21, the processor of Example 17, further comprising a hardware TPDS miss handler coupled to the core, wherein the TPDS is further to: a) determine whether the physical address is present in the TPDS; b) responsive to the physical address not being present in the TPDS: i) place the physical address into an entry in the TPDS in a valid, locked state; and ii) transmit a miss request to the hardware TPDS miss handler to perform the check as to modification of the original code.

In Example 22, the processor of Example 21, wherein the TPDS is further to: a) monitor incoming snoop traffic; b) detect a store operation to the physical address for which the entry in the TPDS is valid; and c) mark the entry as invalid, to cause execution of the translation check instruction to trap to execution of the binary translation.

In Example 23, the processor of Example 21, wherein, responsive to receipt of a check clearance from the hardware TPDS miss handler, the TPDS is further to unlock the entry in the TPDS.

In Example 24, the processor of Example 21, wherein, responsive to a receipt of a failure indication from the hardware TPDS miss handler, the TPDS is further to invalidate the entry in the TPDS, to cause execution of the translation check instruction to trap to execution of the binary translation.

Various embodiments may have different combinations of the structural features described above. For instance, all optional features of the processors and methods described above may also be implemented with respect to a system described herein and specifics in the examples may be used anywhere in one or more embodiments.

Example 25 is a method comprising: 1) storing, by a processor core in a memory, original code and a fingerprint data structure; 2) translating, by the processor core, using binary translation, a page of the original code to a translated page code; 3) computing, by the processor core, a fingerprint of the page of the original code; 4) storing, by the processor core, the fingerprint and a physical address for the page in a way selected within the fingerprint data structure; and 5) adding, by the processor core, a translation check instruction to the translated page code, the translation check instruction to contain the physical address for the page in the memory and the way of the fingerprint data structure, wherein when executed, the translation check instruction is to cause the processor core to perform a check as to modification to the page of the original code.

In Example 26, the method of Example 25, wherein computing the fingerprint comprises performing, on the page of the original code, modulo arithmetic using polynomials with binary coefficients.

In Example 27, the method of Example 25, further comprising: 1) detecting, by a translation protection data structure (TPDS) of the processor core, modification to the page of the original code; and 2) upon execution of the translation check instruction by the processor core, transmitting, to the TPDS, a modification check request comprising the physical address of the original code and the way of the fingerprint data structure.

In Example 28, the method of Example 27, further comprising implementing the TPDS as a hardware-managed, set-associative storage structure that is to employ least recently used (LRU) replacement logic.

In Example 29, the method of Example 27, wherein the way of the fingerprint data structure is encoded within a plurality of way bits of the translation check instruction, further comprising one of: 1) selecting, by the processor core, a second way within the TPDS, for access to the physical address, based on one or more of the least significant bits of way bits; or 2) selecting, by the processor core, the second way based on a priority encoded within the plurality of way bits.

In Example 30, the method of Example 27, further comprising: 1) accessing, by the TPDS, the physical address in the TPDS; 2) responsive to the physical address being located in a valid, unlocked state, the TPDS issuing a check clearance; and 3) responsive to the physical address being located in a valid, locked state, the TPDS stalling until the physical address is unlocked.

In Example 31, the method of Example 27, further comprising: 1) determining, the TPDS, whether the physical address is present in the TPDS; and 2) responsive to the physical address not being present in the TPDS, the TPDS: a) placing the physical address into an entry in the TPDS in a valid, locked state; and b) transmitting a miss request to a hardware TPDS miss handler to perform the check as to modification of the original code.

In Example 32, the method of Example 31, further comprising: 1) monitoring, by the TPDS, incoming snoop traffic; 2) detecting, by the TPDS, a store operation to the physical address for which the entry in the TPDS is valid; and 3) marking, by the TPDS, the entry as invalid, to cause execution of the translation check instruction to trap to execution of the binary translation.

In Example 33, the method of Example 31, further comprising, responsive to receiving a check clearance from the hardware TPDS miss handler, unlocking, by the TPDS, the entry in the TPDS.

In Example 34, the method of Example 31, further comprising, responsive to receiving a failure indication from the hardware TPDS miss handler, invalidating, by the TPDS, the entry in the TPDS, to cause execution of the translation check instruction to trap to execution of the binary translation.

Various embodiments may have different combinations of the structural features described above. For instance, all optional features of the processors and methods described above may also be implemented with respect to a system described herein and specifics in the examples may be used anywhere in one or more embodiments.

Example 35 is a non-transitory computer-readable medium storing instructions, which when executed by a processor having a core and a memory, cause the processor to execute a plurality of logic operations comprising: 1) storing, by the core in the memory, original code and a fingerprint data structure; 2) translating, by the processor core, using binary translation, a page of the original code to a translated page code; 3) computing, by the processor core, a fingerprint of the page of the original code; 4) storing, by the processor core, the fingerprint and a physical address for the page in a way selected within the fingerprint data structure; and 5) adding, by the processor core, a translation check instruction to the translated page code, the translation check instruction to contain the physical address for the page in the memory and the way of the fingerprint data structure, wherein when executed, the translation check instruction is to cause the processor core to perform a check as to modification to the page of the original code.

In Example 36, the non-transitory computer-readable medium of Example 35, wherein computing the fingerprint comprises performing, on the page of the original code, modulo arithmetic using polynomials with binary coefficients.

In Example 37, the non-transitory computer-readable medium of Example 35, wherein the plurality of logic operations further comprises: 1) detecting, by a translation protection data structure (TPDS) of the processor core, modification to the page of the original code; and 2) upon execution of the translation check instruction by the processor core, transmitting, to the TPDS, a modification check request comprising the physical address of the original code and the way of the fingerprint data structure.

In Example 38, the non-transitory computer-readable medium of Example 37, wherein the plurality of logic operations further comprises implementing the TPDS as a hardware-managed, set-associative storage structure that is to employ least recently used (LRU) replacement logic.

In Example 39, the non-transitory computer-readable medium of Example 37, wherein the way of the fingerprint data structure is encoded within a plurality of way bits of the translation check instruction, wherein the plurality of logic operations further comprises one of: 1) selecting, by the processor core, a second way within the TPDS, for access to the physical address, based on one or more of the least significant bits of way bits; or 2) selecting, by the processor core, the second way based on a priority encoded within the plurality of way bits.

In Example 40, the non-transitory computer-readable medium of Example 37, wherein the plurality of logic operations further comprises: 1) accessing, by the TPDS, the physical address in the TPDS; 2) responsive to the physical address being located in a valid, unlocked state, the TPDS issuing a check clearance; and 3) responsive to the physical address being located in a valid, locked state, the TPDS stalling until the physical address is unlocked.

In Example 41, the non-transitory computer-readable medium of Example 37, wherein the plurality of logic operations further comprises: 1) determining, the TPDS, whether the physical address is present in the TPDS; and 2) responsive to the physical address not being present in the TPDS, the TPDS: a) placing the physical address into an entry in the TPDS in a valid, locked state; and b) transmitting a miss request to a hardware TPDS miss handler to perform the check as to modification of the original code.

In Example 42, the non-transitory computer-readable medium of Example 41, wherein the plurality of logic operations further comprises: 1) monitoring, by the TPDS, incoming snoop traffic; 2) detecting, by the TPDS, a store operation to the physical address for which the entry in the TPDS is valid; and 3) marking, by the TPDS, the entry as invalid, to cause execution of the translation check instruction to trap to execution of the binary translation.

In Example 43, the non-transitory computer-readable medium of Example 41, wherein the plurality of logic operations further comprises, responsive to receiving a check clearance from the hardware TPDS miss handler, unlocking, by the TPDS, the entry in the TPDS.

In Example 44, the non-transitory computer-readable medium of Example 41, wherein the plurality of logic operations further comprises, responsive to receiving a failure indication from the hardware TPDS miss handler, invalidating, by the TPDS, the entry in the TPDS, to cause execution of the translation check instruction to trap to execution of the binary translation.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory to store original code and a fingerprint data structure; and
   a core coupled to the memory, the core to:
      translate, using binary translation, a page of the original code to a translated page code;
      compute a fingerprint of the page of the original code;
      store the fingerprint and a physical address for the page in a way selected within the fingerprint data structure; and
      add a translation check instruction to the translated page code, the translation check instruction to contain the physical address for the page in the memory and the way of the fingerprint data structure, wherein when executed, the translation check instruction is to cause the core to perform a check as to modification to the page of the original code.

2. The processor of claim 1, wherein to compute the fingerprint, the core is to perform, on the page of the original code, modulo arithmetic using polynomials with binary coefficients.

3. The processor of claim 1, wherein the core further comprises a translation protection data structure (TPDS) to detect modification to the page of the original code, wherein the core is further to, upon execution of the translation check instruction, transmit, to the TPDS, a modification check request comprising the physical address of the original code and the way of the fingerprint data structure.

4. The processor of claim 3, wherein the TPDS comprises a hardware-managed, set-associative storage structure that is to employ least recently used (LRU) replacement logic.

5. The processor of claim 3, wherein the way of the fingerprint data structure is encoded within a plurality of way bits of the translation check instruction, and wherein the core is further to one of:
   select a second way within the TPDS, for access to the physical address, based on one or more of the least significant bits of way bits; or
   select the second way based on a priority encoded within the plurality of way bits.

6. The processor of claim 3, wherein the TPDS is further to:
   access the physical address in the TPDS;
   responsive to the physical address being located in a valid, unlocked state, issue a check clearance; and responsive to the physical address being located in a valid, locked state, stall until the physical address is unlocked.

7. The processor of claim 3, further comprising a hardware TPDS miss handler coupled to the core, wherein the TPDS is further to:
  determine whether the physical address is present in the TPDS;
  responsive to the physical address not being present in the TPDS:
    place the physical address into an entry in the TPDS in a valid, locked state; and
    transmit a miss request to the hardware TPDS miss handler to perform the check as to modification of the original code.

8. The processor of claim 7, wherein the TPDS is further to:
  monitor incoming snoop traffic;
  detect a store operation to the physical address for which the entry in the TPDS is valid; and
  mark the entry as invalid, to cause execution of the translation check instruction to trap to execution of the binary translation.

9. The processor of claim 7, wherein, responsive to receipt of a check clearance from the hardware TPDS miss handler, the TPDS is further to unlock the entry in the TPDS.

10. The processor of claim 7, wherein, responsive to a receipt of a failure indication from the hardware TPDS miss handler, the TPDS is further to invalidate the entry in the TPDS, to cause execution of the translation check instruction to trap to execution of the binary translation.

11. A system-on-a-chip (SoC) comprising:
  a memory to store original code and a fingerprint data structure, the fingerprint data structure to store, in a way selected within the fingerprint data structure, an entry comprising a physical address for a page of the original code and a fingerprint generated from the page;
  a binary translator circuit coupled to the memory, the binary translator circuit to translate, using binary translation, the page of the original code to a translated page code;
  a core coupled to the memory and the binary translator circuit, the core including a translation protection data structure (TPDS) to detect modification to the page of the original code, wherein the core is to, upon execution of a translation check instruction included within the translated page code, transmit, to the TPDS, a modification check request comprising the physical address of the page in the memory and the way selected within the fingerprint data structure; and
  a hardware TPDS miss handler coupled to the core, the hardware TPDS miss handler to queue a miss request received from the TPDS responsive to the physical address not being present in the TPDS.

12. The SoC of claim 11, wherein the binary translator circuit is further to generate the fingerprint via a computation, on the page of the original code, of modulo arithmetic using polynomials with binary coefficients.

13. The SoC of claim 11, wherein the hardware TPDS miss handler is further to process a plurality of miss requests in parallel, the plurality of miss requests received from a plurality of cores, wherein the core is one of the plurality of cores.

14. The SoC of claim 11, wherein the core is one of plurality of cores, each of which contains a TPDS, wherein the hardware TPDS miss handler comprises a request queue to queue a plurality of miss requests from the plurality of cores, and wherein the hardware TPDS miss handler is further to:
  analyze the plurality of miss requests located in the request queue to identify identical miss requests, associated with an identical physical page, received from more than one TPDS;
  perform a modification check in relation to the identical miss requests; and
  respond identically to the identical miss requests from the more than one TPDS.

15. The SoC of claim 11, wherein the miss request also includes the physical address of the original code and the way of the fingerprint data structure, and wherein the hardware TPDS miss handler is further to:
  select the miss request from a plurality of miss requests in a request queue;
  look up the entry in the fingerprint data structure using the physical address and the way; and
  responsive to the entry being invalid, respond to the TPDS with a failure indication.

16. The SoC of claim 11, wherein the fingerprint comprises a stored fingerprint, wherein the miss request also includes the physical address of the original code and the way of the fingerprint data structure, and wherein the hardware TPDS miss handler is further to:
  select the miss request from a plurality of miss requests in a request queue;
  look up the entry in the fingerprint data structure using the physical address and the way;
  generate a computed fingerprint of the page at the physical address using a polynomial divisor stored in a configuration register of the hardware TPDS miss handler; and
  compare the computed fingerprint with the stored fingerprint located in the fingerprint data structure.

17. The SoC of claim 16, wherein responsive to the computed fingerprint being a match to the stored fingerprint, the hardware TPDS miss handler is further to:
  respond to the TPDS with a check clearance indication; and
  store the physical address of the page into a new entry of the TPDS.

18. The SoC of claim 16, wherein responsive to the computed fingerprint not being a match to the stored fingerprint, respond to the TPDS with a failure indication, and wherein the TPDS is further to transmit the failure indication to a trap handler for the translation check instruction, and wherein the binary translator circuit is to invalidate the entry in the fingerprint data structure in response to the failure indication.

19. A processor comprising:
  a memory to store original code and a fingerprint data structure, the fingerprint data structure to store, in a way of the fingerprint data structure, an entry comprising a physical address for a page of the original code and a stored fingerprint generated from the page of the original code;
  a core coupled to the memory, the core including a translation protection data structure (TPDS) to detect modification to the page of the original code, wherein the core is to, upon execution of a translation check instruction included within a translated page code corresponding to the page, transmit, to the TPDS, a modification check request comprising the physical address of the page in the memory and the way of the fingerprint data structure; and a hardware TPDS miss handler coupled to the core, the hardware TPDS miss handler to process a miss request received from the TPDS responsive to the physical address not being present in the TPDS, wherein to process the miss request, the hardware TPDS miss handler is to:

generate a computed fingerprint of the page located at the physical address; and responsive to the computed fingerprint being a match to the stored fingerprint located in the fingerprint data structure:

respond to the TPDS with a check clearance indication; and store the physical address of the page into a new entry of the TPDS.

20. The processor of claim 19, further comprising a binary translator circuit coupled to the core, the binary translator circuit to:

translate, using binary translation, a page of the original code to the translated page code; and generate the stored fingerprint via a computation, on the page of the original code, of modulo arithmetic using polynomials with binary coefficients.

21. The processor of claim 19, wherein the core is further to:

translate, using binary translation, a page of the original code to the translated page code; and generate the stored fingerprint via a computation, on the page of the original code, of modulo arithmetic using polynomials with binary coefficients.

22. The processor of claim 19, wherein the core is further to:

select the way of the fingerprint data structure;

store the physical address and the stored fingerprint in the way of the fingerprint data structure; and add the translation check instruction to the translated page code, the translation check instruction to contain the physical address of the original code in the memory and the way of the fingerprint data structure.

23. The processor of claim 19, wherein the miss request includes the physical address of the original code and the way of the fingerprint data structure, and wherein the hardware TPDS miss handler is further to:

select the miss request from a plurality of miss requests in a request queue;

look up the entry in the fingerprint data structure using the physical address and the way; and responsive to the entry being invalid, respond to the TPDS with a failure indication.

24. The processor of claim 19, wherein the hardware TPDS miss handler comprises a configuration register, wherein upon boot initialization of the processor, the core is further to:

set the configuration register for a base address of the fingerprint data structure in the memory;

allocate a portion of the memory for the fingerprint data structure;

select a polynomial divisor for generation of the computed fingerprint; and store the polynomial divisor in the configuration register.

* * * * *